United States Patent [19]
McCormick et al.

[11] Patent Number: 6,023,420
[45] Date of Patent: Feb. 8, 2000

[54] THREE-PHASE INVERTER FOR SMALL HIGH SPEED MOTORS

[75] Inventors: John A. McCormick, Norwich, Vt.; Javier A. Valenzuela, Hanover, N.H.

[73] Assignee: Creare, Inc., Hanover, N.H.

[21] Appl. No.: 09/193,617

[22] Filed: Nov. 17, 1998

[51] Int. Cl.[7] .......................... H02M 7/537; H02M 7/00; H01F 27/24

[52] U.S. Cl. .............................. 363/131; 363/71; 336/212

[58] Field of Search ...................................... 363/131, 132, 363/71, 46; 336/175, 212, 184, 182, 229

[56] References Cited

U.S. PATENT DOCUMENTS

| | | | |
|---|---|---|---|
| 4,117,364 | 9/1978 | Baker | 318/230 |
| 4,255,784 | 3/1981 | Rosa | 363/129 |
| 4,591,965 | 5/1986 | Dickerson | 363/43 |
| 4,673,888 | 6/1987 | Engelmann et al. | 330/10 |
| 4,743,828 | 5/1988 | Jahns et al. | 363/43 |
| 4,870,557 | 9/1989 | Stacey | 363/43 |
| 4,870,558 | 9/1989 | Luce | 363/87 |
| 5,008,797 | 4/1991 | Patel et al. | 363/43 |
| 5,027,265 | 6/1991 | Dhyanchand et al. | 363/37 |

OTHER PUBLICATIONS

Sriraghavan et al., *A novel three–phase stepped–wave inverter using eight thyristors,* Int. J. Electronics, 1980, vol. 48, No. 1, 71–81, Jan. 14, 1980.

Sriraghavan et al., *A single–phase pulse–width–controlled inverter circuit,* Int. J. Electronics, 1980, vol. 49, No. 6, 503–512.

Sriraghavan et al., *Three–phase pulse–amplitude and width modulator inverter system,* IEE Proc., vol. 128, Pt. B, No. 3, May 1981, 167–171.

Sriraghavan et al., *Multistage three–phase controlled stepped–wave inverter system,* Int. J. Electronics, 1984, vol. 56, No. 2, 95–103.

Kernick et al., *Static inverter with Neutralization of Harmonics,* AIEE, vol. 81, May 1962, 59–68.

Wilson, J.W., *A Double Bridge Inverter with Magnetic Coupling—Part I: Voltage Waveforms,* IEEE–IAS Annual Meeting Conference Record, Oct. 1976, 1107–1113.

Bashir et al., *Voltage Control in 3–Phase Stepped Wave Inverters,* Int. J. Electronics, May 27, 1982 1983, vol. 54, No. 3, 453–470.

Dolan, F.X., *Preliminary Thermal Performance Model for the Single Stage Reverse–Brayton Cycle Cryogenic Cooler—Model Description and Sample Calculations,* Creare, Inc., TM–1465, Jan. 1991.

*Primary Examiner*—Shawn Riley
*Assistant Examiner*—Rajnikant B. Patel
*Attorney, Agent, or Firm*—Wood, Herron & Evans, L.L.P.

[57] ABSTRACT

A three-phase inverter for small, high speed motors such as a miniature centrifical compressor which has a low voltage, high current requirement. The inverter is supplied with DC power at 28 volts, and produces power of about 50 to 500 watts at about 15 volts, and at frequencies of about 5 to 9 kilohertz. Six D-type flip-flops with clock inputs produce twelve signals which are provided to six bridge drivers. Each bridge driver controls two MOSFET's in series. The MOSFET's are supplied with DC power. Outputs are fed to primaries of adjacent transformers in a circular array. The transformer secondaries are arranged in a star configuration to produce stepped voltage and saw-tooth current output wave forms approximating sinusoids in three phases.

46 Claims, 23 Drawing Sheets

SECTION "A-A"

THREE-PHASE INVERTER FOR SMALL HIGH SPEED MOTORS

STATEMENT AS TO FEDERALLY SPONSORED RESEARCH

This invention was made with Government support under Contract Number NAS5-30630 awarded by the National Aeronautics and Space Administration.

FIELD OF THE INVENTION

The present invention relates to power inverters for generating alternating current signals from direct current signals.

BACKGROUND OF THE INVENTION

Power inverters are known in the art and used in many applications where it is necessary to generate alternating current power from a direct current power source. As just one example, inverters have been used to generate AC power for driving portable appliances, from the DC power available from a car cigarette lighter.

One particular application of an inverter relevant to the present patent application, is to power AC motors from a DC power source. Although this need arises in many environments, an environment of particular interest in this application is spacecraft, where the available power is typically DC power, available from a spacecraft power bus. A range of spaceborne sensors utilize cryocoolers based on the reverse-Brayton cycle. A single stage reverse-Brayton (SSRB) cryocooler provides 5 watts of cooling at 65 K for a range of space sensor applications. Key components for the cooler are a single-stage turboexpander, a high effectiveness heat exchanger, a single-stage motor-driven centrifugal compressor, and an electrical drive for the motor. Three-phase high frequency AC power is needed to drive the compressor motor.

Inverters/variable speed motor drives are available commercially from many suppliers, but unfortunately are not well suited to the described application. The highest frequency commercial inverters tend to have rectangular waveforms with high harmonic content. They also are not optimized for the low voltage-high current character of the compressor motor. Pulse width modulation (PWM) is used to eliminate higher harmonics in some advanced commercial inverters. PWM, however, relies on microprocessor control, and computation time generally limits output frequencies to 200 Hz and lower.

Furthermore, for spaceborne applications, it is important to maintain high efficiency. Harmonics in the inverter output should be avoided to whatever extent possible because they contribute losses in the motor without contributing useful output, lowering the efficiency of the motor.

A search of commercially available inverters failed to turn up anything suitable, establishing the need to develop a high frequency inverter specially tailored to the requirements of the SSRB compressor motor.

SUMMARY OF THE INVENTION

A power inverter in accordance with principles of the present invention includes transformers each having a primary winding and a secondary winding, the primary windings of the transformers being connected in series in a transformer ring, and respective pairs of the secondary windings being connected in series between the neutral terminal and a respective one of the output terminals. To drive the transformers, switching circuits are connected to the nodes between each pair of the primary windings in the transformer ring. The switching circuits alternately connect the nodes to which they are connected to the power terminal and the ground terminal in response to control signals.

A power inverter of this kind may be made with as few as four transformers but in the specific embodiment described below utilizes six transformers to develop three phase power at three output terminals.

In the specific embodiment described below, there are larger transformers with larger cores and smaller transformers with smaller cores. The transformers with smaller cores alternate with the transformers with larger cores in the transformer ring. The control signals applied to the switching circuits cause the direct current signal to be applied across the primary winding of the smaller transformers for a shorter period of time than across the primary windings of the larger transformers. The respective pairs of secondary windings connected in series between the neutral terminal and a respective output terminal include secondary windings from one smaller transformer and one larger transformer, where the smaller and larger transformers are in opposite positions in the transformer ring.

In this specific embodiment, the switching circuits include a pair of MOSFET switches, one switch connected from the node between two primary windings to the DC power terminal, and one switch connected from the node to the DC ground terminal. These switches are driven by signals derived from complementary outputs of a flip-flop circuit. The flip-flop circuits are connected in a flip-flop ring such that an output of each flip-flop circuit is connected to the input of the next flip-flop circuit in the flip-flop ring. The outputs of adjacent flip-flop circuits in the flip-flop ring are connected to switching circuits at opposite positions in the transformer ring.

Parameters for the inverter are driven by the needs of the compressor motor. The motor has a 0.25 inch (0.635 cm) diameter shaft with a nominal rotational speed of 8000 rev/s. The projected power requirement for the compressor is 175 watts. The motor is a three-phase solid rotor induction motor, designed with stator coils of a low number of turns of moderately heavy gauge wire to ease the conduction of heat from the coils. The low number of turns, combined with the small size of the motor, results in a low operating AC voltage, nominally 15 volt-rms, with high current, nominally 8 amp-rms per phase. Objectives for the inverter are high efficiency (90 to 95%) and low harmonic content at this nominal design condition. An additional requirement is that the inverter components carry the starting current drawn by the induction motor. (At zero speed, the electrical impedance of an induction motor is a minimum, resulting in starting currents that can significantly exceed the operating current.) A further objective is that the inverter constitute a simple self-contained and compact electronics package offering high reliability.

The exemplary inverter described below supplies three-phase AC power to the compressor motor at nominal 8 kHz, 15 volt-rms and 7.8 amp-rms per phase, with a 175 watt total output. The inverter draws power from a spacecraft bus at 28 volt-DC. All objectives have been successfully met or exceeded. The inverter shows an efficiency of 95% while driving a prototype compressor at frequencies and power levels in excess of 8 kHz and 300 watts. Calorimeter measurements verify the relations used to predict inverter losses. Start-up tests with tilting gas pad bearings and locked-rotor current measurements were made. Locked rotor results show that the maximum possible starting currents are well below the current ratings of the MOSFET switches.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1A:
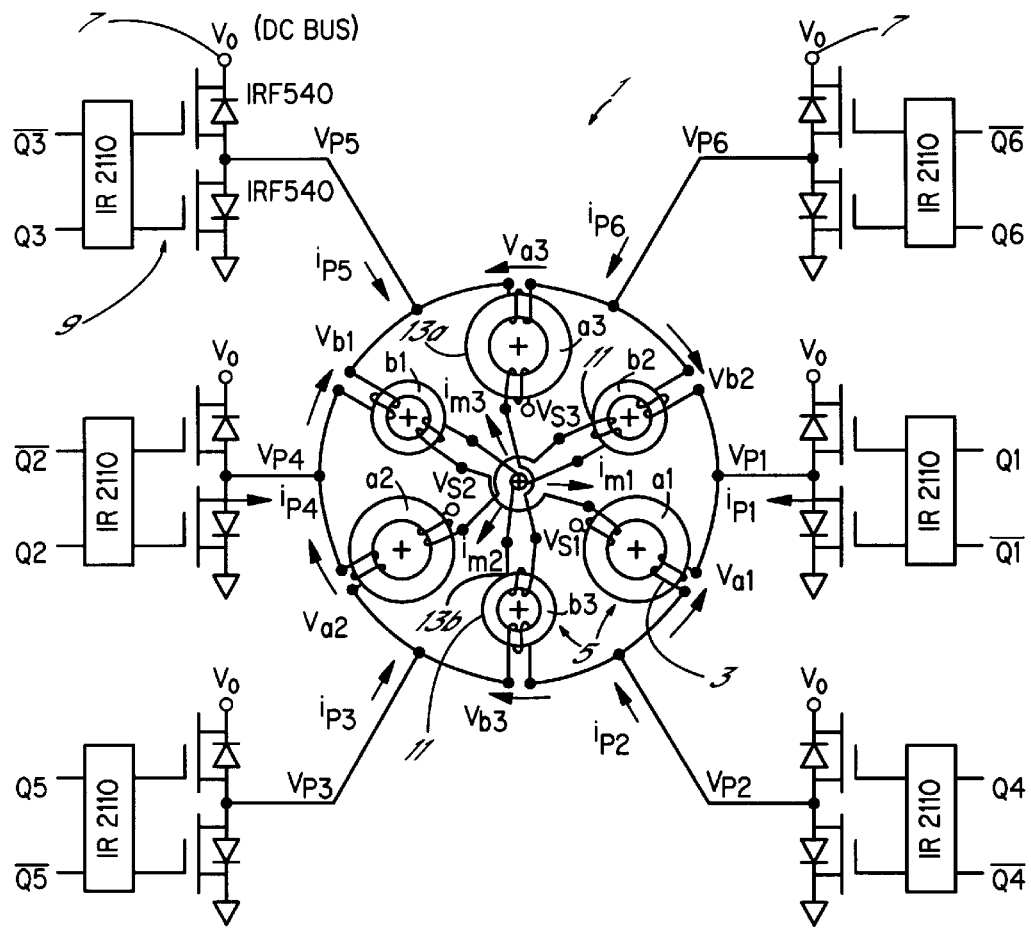
FIGS. 1a and 1b are simplified schematics of the inverter.

For use as a reference in the following detailed description of the invention, the following is a list of symbols to be used:

| | |
|---|---|
| $A_{core}$ | Cross-sectional area of toroid |
| B | Magnetic flux density in toroid |
| $B_{max}$ | Maximum value of B |
| $C_p$ | Heat capacity at constant pressure |
| $C_b$ | Bootstrap capacitance |
| $C_c$ | Timing circuit capacitance |
| $D_i$ | Inner diameter of toroid |
| $D_o$ | Outer diameter of toroid |
| f | Inverter frequency |
| $f_c$ | Clock frequency |
| $f_s$ | Rotational frequency of motor |
| h | Height of toroid |
| $H_s$ | Isentropic enthalpy rise for compressor |
| $i_o$ | DC current supplied to inverter |
| $i_a$ | Primary current for "a" transformer |
| $i_{a0}$ | Amplitude of $i_a$ waveform |
| $i_b$ | Primary current for "b" transformer |
| $i_{b0}$ | Amplitude of $i_b$ waveform |
| $i_m$ | Current in one motor phase |
| $i_{m0}$ | Amplitude of $i_m$ waveform |
| $i_p$ | Current in primary lead |
| $i_{p0}$ | Amplitude of $i_p$ waveform |
| $i_r$ | Component of $i_m$ in load resistance |
| $i_x$ | Component of $i_m$ in load inductance |
| $K_c$ | Coefficient in core loss expression |
| L | Load inductance |
| m | Frequency exponent in core loss expression |
| ṁ | Net mass flow rate of compressor |
| n | $B_{max}$ exponent in core loss expression |
| $N_{pa}$ | Number of primary turns for "a" transformer |
| $N_{pb}$ | Number of primary turns for "b" transformer |
| $N_{sa}$ | Number of secondary turns for "a" transformer |
| $N_{sb}$ | Number of secondary turns for "b" transformer |
| P1 | Compressor inlet pressure |
| P2 | Compressor exit pressure |
| PR | P2/P1 |
| r | Radial coordinate for toroid B field |
| R | Load resistance for one phase |
| $R_c$ | Timing circuit resistance |
| $R_{ds}$ | MOSFET drain-to-source on resistance |
| $R_{pa}$ | Primary coil resistance for "a" transformer |
| $R_{pb}$ | Primary coil resistance for "b" transformer |
| $R_{sa}$ | Secondary coil resistance for "a" transformer |
| $R_{sb}$ | Secondary coil resistance for "b" transformer |
| $R_x$ | Resistance of load inductor for one phase |

-continued

| | |
|---|---|
| s | Induction motor slip: $(f - f_s)/f$ |
| t | Time |
| $T_1$ | Compressor inlet temperature |
| $V_{core}$ | Volume of toroidal core |
| $V_0$ | DC voltage supplied to inverter |
| $V_a$ | Voltage across primary coil of "a" transformer |
| $V_b$ | Voltage across primary coil of "b" transformer |
| $V_m$ | Line-to-neutral voltage for one phase of motor |
| $V_{m0}$ | Amplitude of $V_m$ waveform |
| $V_p$ | Voltage at primary lead |
| $V_s$ | Line-to-neutral voltage for one phase of inverter secondary |
| $W_0$ | DC power supplied to inverter: $i_0 V_0$ |
| $W_{core}$ | Total core loss for inverter transformers |
| $W_{inv}$ | Total inverter loss |
| $W_m$ | Total power supplied to three motor phases by inverter |
| $W_{rds}$ | Total loss from $R_{ds}$ for all MOSFET's |
| $W_{res}$ | Total resistive loss for inverter transformer coils |
| $W_s$ | Isentropic compression power: $m H_s$ |
| X | Reactance of load inductor for one phase: $\omega L$ |
| $\gamma$ | Ratio of constant volume to constant pressure heat capacities |
| $\eta_{inv}$ | Inverter efficiency: $W_m/W_0$ |
| $\eta_s$ | Overall isentropic efficiency: $W_s/W_0$ |
| $\phi_a$ | Magnetic flux in "a" transformer |
| $\phi_{a0}$ | Amplitude of $\phi_a$ waveform |
| $\phi_b$ | Magnetic flux in "b" transformer |
| $\phi_{b0}$ | Amplitude of $\phi_b$ waveform |
| $\theta$ | Power factor angle ($i_m$ lags $V_m$ by $\theta$) |
| $\omega$ | Angular frequency of inverter: $2\pi f$ |

FIG. 1a shows a simplified overall schematic of the six-transformer inverter, generally indicated by the numeral 1. Primary coils 3 of the six toroidal transformers 5 are connected in series in a ring. These coils are sequentially energized from the DC bus 7 at voltage $V_0$ through the six pairs of MOSFET transistor switches 9 which supply chopped voltage signals $V_{p1}$ through $V_{p6}$. The secondary coils 11, located on the inside of the ring of transformers 5, provide a three-phase Y-connected AC output consisting of line-to-neutral voltages $V_{s1}$, $V_{s2}$ and $V_{s3}$. Each of these phase voltages can be seen to be derived from a series connection of the secondary coils 11 of two diametrically opposed toroids 13, 13a and 13b, for example.

The timing pattern of the MOSFET switches 9 on the primary that provides a high quality AC output from the secondary can be described as a rotating pattern of primary coil energization that sequentially energizes the three secondary phases.

The MOSFET switches generate the input voltages $V_{p1}$ through $V_{p6}$ by alternately switching the primary leads between $V_0$ and ground. These input voltages in turn produce voltage waveforms across the primary coils 3 that are transformed to the secondary coils 11. Extensive experimentation has led to the pattern represented by the six $V_p$ waveforms shown in FIG. 2. Each $V_p$ waveform follows the pattern of the logic signals that trigger the IR2110 bridge drivers to switch the MOSFET's on and off. These logic signals, denoted as Q1 through Q6 with complementary signals $\overline{Q1}$ through $\overline{Q6}$, are generated by the six cascaded D-type flip-flop elements 15 shown in FIG. 1b. A timing chip (not shown) provides the clock 17 signal that triggers the flip-flops 15. Each Q signal, and consequently each $V_p$ waveform, is a square wave whose period equals 12 clock periods. The inverter output waveform is constructed from these $V_p$ waveforms and therefore has the same period. The inverter output frequency is thus one-twelfth the clock frequency. Setting of the clock frequency through a potentiometer adjustment in the timing chip circuit sets the inverter frequency. The clock, Q and $\overline{Q}$ signals are shown in FIG. 3.

Each $V_p$ waveform is high ($V_0$) for six clock periods and low (ground) for the next six clock periods. Phase delays between successive $V_p$ waveforms are seen to alternate between three clock periods and one clock period. Referring to FIG. 1a, the delay is three clock periods between the $V_p$ signals across the transformers labeled a1, a2 and a3, and one clock period between the signals across transformers b1, b2 and b3.

In working from the $V_p$ waveforms to the eventual secondary output waveforms, the next step is to examine the primary coil waveforms $V_{a1}$, $V_{a2}$, $V_{a3}$, $V_{b1}$, $V_{b2}$ and $V_{b3}$ formed by the differences between adjacent $V_p$ waveforms:

| | |
|---|---|
| $V_{a1} = V_{p1} - V_{p2}$ | $V_{b1} = V_{p5} - V_{p4}$ |
| $V_{a2} = V_{p3} - V_{p4}$ | $V_{b2} = V_{p1} - V_{p6}$ |
| $V_{a3} = V_{p5} - V_{p6}$ | $V_{b3} = V_{p3} - V_{p2}$ |

Figure 4:
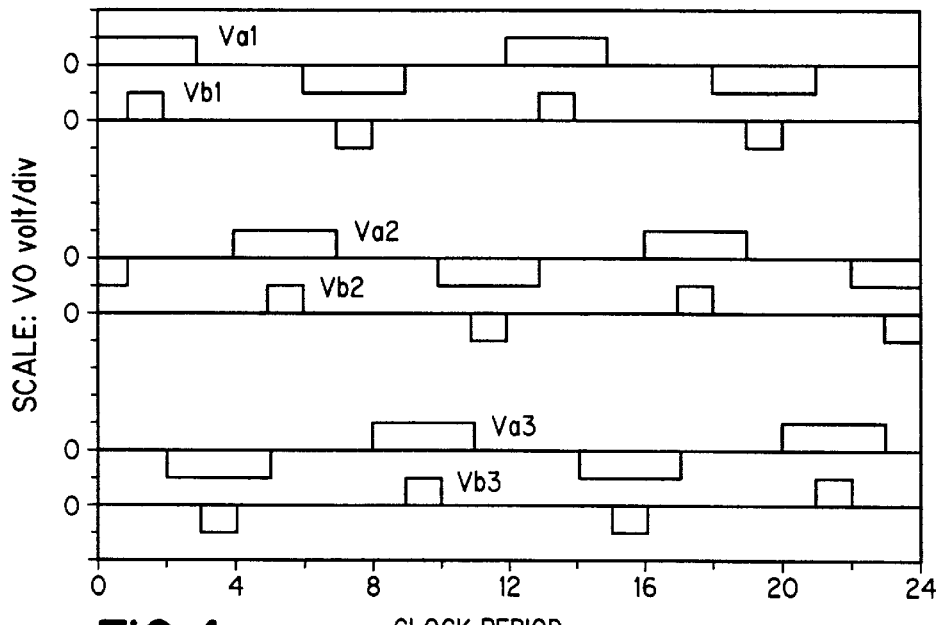
FIG. 4 shows voltage waveforms across primary coils.

These are shown in FIG. 4. Each primary coil waveform consists of alternative positive and negative square pulses of height $V_0$. The width of these pulses is equal to the phase delay between the two $V_p$ waveforms across the coil, three clock periods for transformers a1, a2 and a3, and one clock period for transformers b1, b2 and b3. With one-third the voltage pulse width, the peak magnetic flux in the "b" transformers is one-third that in the "a" transformers. The "b" transformers can thus have a substantially smaller core cross section as FIG. 1 indicates schematically.

The line to neutral output voltage $V_{s1}$ is the sum of the secondary coil voltages for transformers a1 and b1. Output voltages $V_{s2}$ and $V_{s3}$ are similarly formed from transformer pairs (a2, b2) and (a3, b3). Assuming ideal transformers, these output voltages are given by:

$$V_{s1} = (N_{sa}/N_{pa})V_{a1} + (N_{sb}/N_{pb})V_{b1}$$

$$V_{s2} = (N_{sa}/N_{pa})V_{a2} + (N_{sb}/N_{pb})V_{b2}$$

$$V_{s3} = (N_{sa}/N_{pa})V_{a3} + (N_{sb}/N_{pb})V_{b3}$$

where $N_{pa}$ and $N_{pb}$ are the numbers of primary turns for the "a" and "b" transformers, and $N_{sa}$ and $N_{sb}$ are the numbers of secondary turns for those transformers. The $V_s$ waveforn is a superposition of the three clock period wide pulses of the $V_a$ waveform with the one clock period wide pulses of the $V_b$ waveform.

Figure 5:
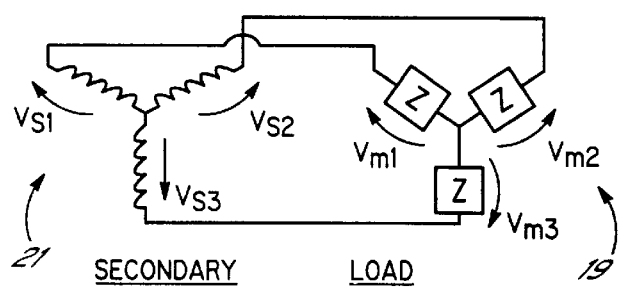
FIG. 5 illustrates a Y-connected secondary and load.

When a Y-connected three-phase load 19, representing the compressor motor, is connected to the secondary 21 as shown in FIG. 5, the line-to-neutral voltages $V_{m1}$, $V_{m2}$ and $V_{m3}$ across the load impedances are formed according to:

$$V_{m1} = (2V_{s1} - V_{s2} - V_{s3})/3 \qquad (1)$$

$$V_{m2} = (2V_{s2} - V_{s3} - V_{s1})/3$$

$$V_{m3} = (2V_{s2} - V_{s3} - V_{s1})/3$$

Note that these are independent of the load impedance.

Figure 6:
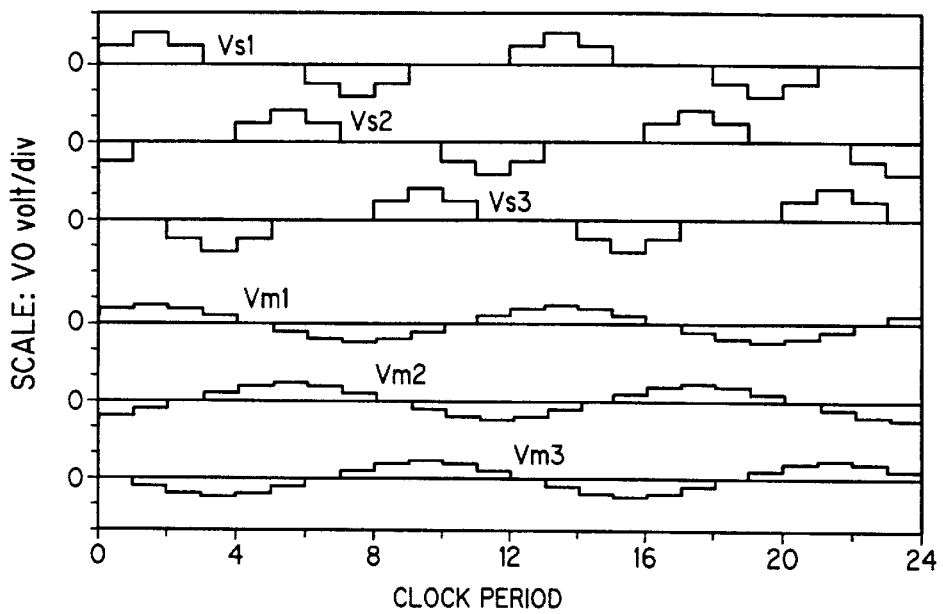
FIG. 6 shows voltage waveforms across secondary coils and load impedances, with turns ratios $N_{sa}/N_{pa}=2/3$ and $N_{sb}/N_{pb}=1/2$.

FIG. 6 shows the $V_s$ and resulting $V_m$ waveforms for the three phases.

Figure 7:
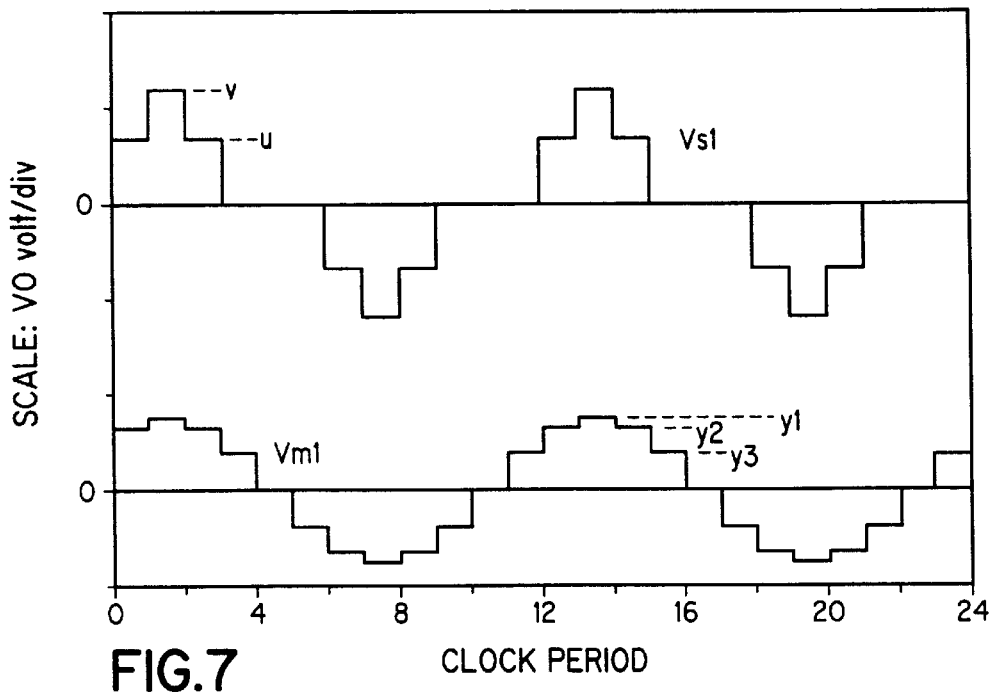
FIG. 7 shows secondary coil and load voltage waveshapes for one phase, with turns ratios $N_{sa}/N_{pa}=2/3$ and $N_{sb}/N_{pb}=1/2$.

FIG. 7 shows the details of typical $V_s$ and $V_m$ waveforms. The combination of the three relatively sharp edged $V_s$ waveforms yields $V_m$ waveforms that are substantially smoother by virtue of a greater number of steps. By properly selecting the $V_m$ step heights, which are determined by the turns ratios, the $V_m$ waveshape can be made to closely approximate a sine wave.

Criteria for selecting the turns ratio can be derived from an examination of the voltage levels at the steps of the $V_s$ and $V_m$ waveforms. In the $V_s$ waveform shown in FIG. 7, the voltage levels at the two steps are:

$$u = (N_{sa}/N_{pa})V_0 \quad (2)$$

$$v = [(N_{sa}/N_{pa}) + (N_{sb}/N_{pb})]V_0 \quad (3)$$

reflecting superposition of the $V_a$ and $V_b$ waveforms. Voltage levels y1, y2 and y3 at the steps of the $V_m$ waveform as shown in FIG. 7 are related to u and v through Equations (1):

$$y1 = 2v/3 \quad (4)$$

$$y2 = u \quad (5)$$

$$y3 = v/3 \quad (6)$$

Voltage level y1 is the amplitude of the $V_m$ waveform, which will be denoted by $V_{m0}$:

$$y1 = V_{m0} \quad (7)$$

It can be shown through a straightforward Fourier series analysis of the stepped $V_m$ waveform that the stepped shape best approximates a sine wave when y2 and y3 are related to y1 through:

$$y2 = y1 \sin 60° \quad (8)$$

$$y3 = y1 \sin 30° \quad (9)$$

In practice, all harmonics of the inverter frequency below the eleventh are eliminated from the $V_m$ waveform when Equations (8) and (9) are satisfied. Since $\sin 30° = 0.5$, Equation (9) is automatically satisfied by Equations (4) and (6). Equation (8) defines a ratio between the turns ratios of the "a" and "b" transformers. First, from Equations (8), (4) and (5):

$$y2/y1 = \sin 60° = (3/2)u/v$$

The ratio of the "a" and "b" turns ratios is obtained by substituting from Equations (2) and (3) for u and v:

$$(N_{sb}/N_{pb})/(N_{sa}/N_{pa}) = 0.7321 \quad (10)$$

Whether or not the transformer designs satisfy Equation (10), the output voltage amplitude $V_{m0}$ is determined by the actual turns ratios and the input DC voltage $V_0$ according to Equations (7), (4) and (3):

$$V_{m0} = (2/3)[N_{sa}/N_{pa}) + (N_{sb}/N_{pb})]V_0 \quad (11)$$

Equations (10) and (11) can be combined to yield these expressions for the most favorable turns ratios in terms of $V_{m0}/V_0$:

$$N_{sa}/N_{pa} = 0.8660 V_{m0}/V_0 \quad (12)$$

$$N_{sb}/N_{pb} = 0.6340 V_{m0}/V_0 \quad (13)$$

These last two equations should be applied cautiously since $V_{m0}/V_0$ is truly determined only by the sum of the two turns ratios through Equation (11). Equations (12) and (13) are only valid when the ratio of $N_{sb}/N_{pb}$ to $N_{sa}/N_{pa}$ is exactly 0.7321, providing the best approximation to a sine wave that is possible with the stepped $V_m$ waveform.

Having fully determined the relations defining voltage levels and waveshapes throughout the inverter, the next step in describing the present invention is to analyze the currents. Once this is accomplished, all information needed to size the transformers and switching transistors is available. The analysis of the currents will begin at the load and work back to the primary leads.

Each of the phase loads shown in FIG. 5 can be modeled as a resistance R in parallel with an inductance L.

Figure 8:
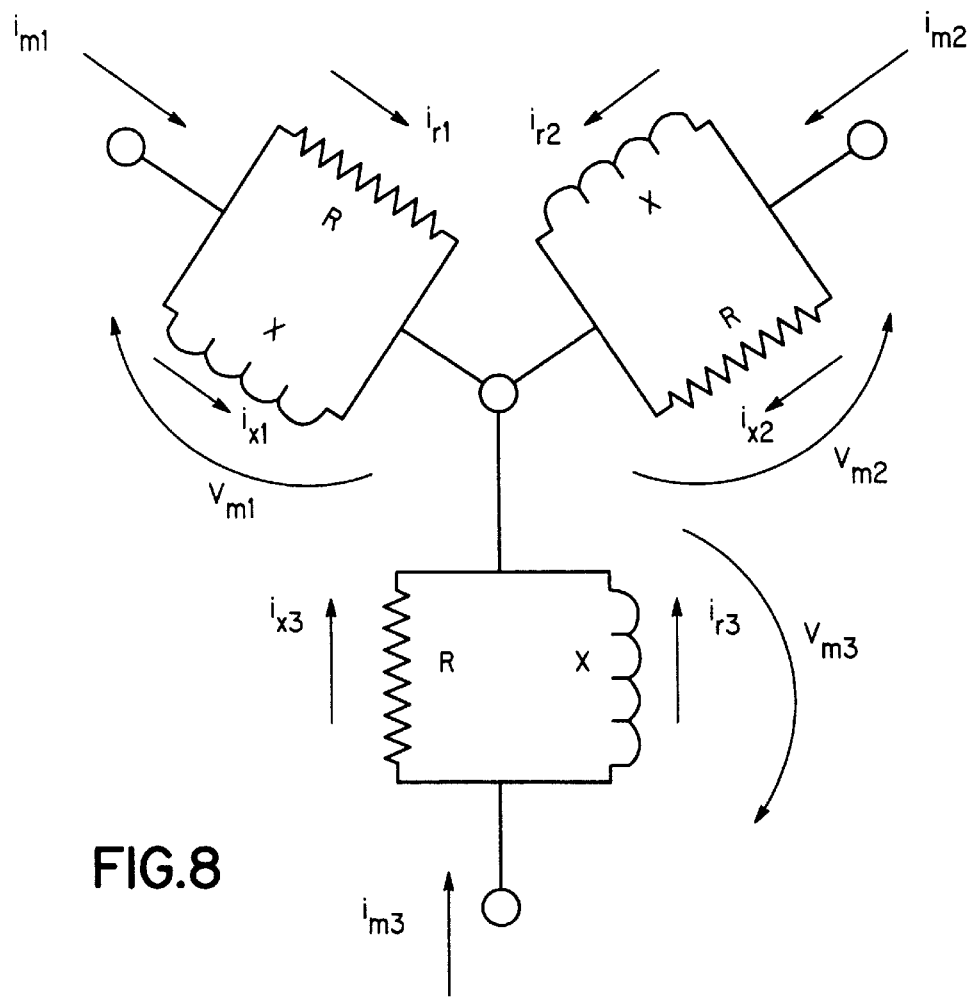
FIG. 8 shows a Y-connected secondary load.

FIG. 8 shows the load elements and current for the three phases. The currents are obtained from the known $V_m$ waveforms as follows:

$$i_r = V_m/R$$

$$i_x = (1/X) \int V_m d(\omega t)$$

$$i_m = i_r + i_x$$

where t is time, $\omega$ is the angular frequency and $X = \omega L$ is the reactance. These equations hold for each phase but the phase subscripts have been omitted for conciseness. It should be noted that the integration process will smooth out the steps in the $V_m$ waveform, making the $i_x$ waveform appear as nearly a pure sine wave. The shape of the resultant current waveform $i_m$ depends only on the ratio R/X which represents the power factor angle $\theta$ according to:

$$R/X = \tan \theta$$

Figure 9:
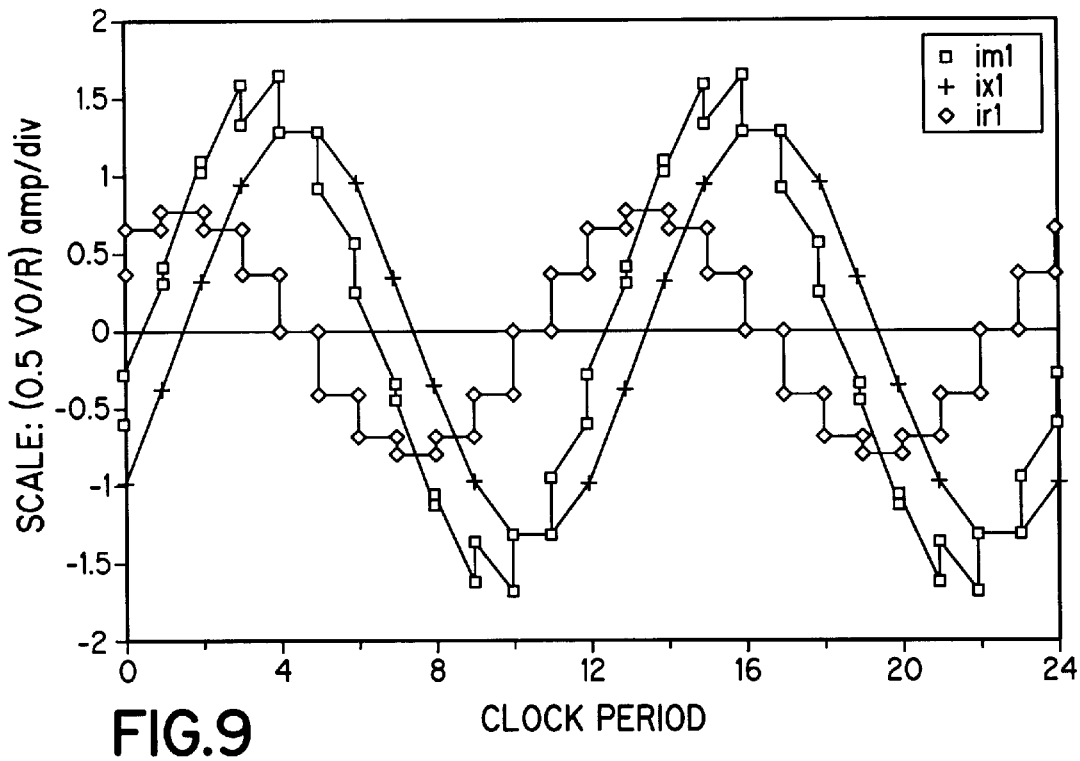
FIG. 9 shows components of load current waveform for one phase with 60° power factor at load.
Figure 10:
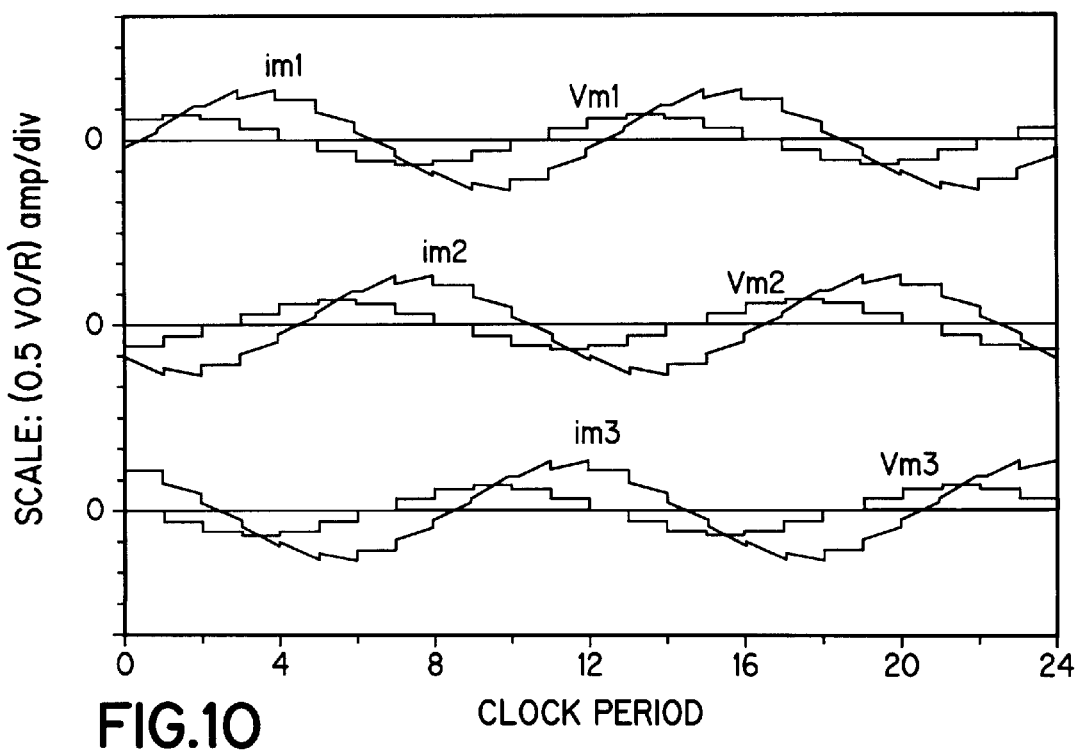
FIG. 10 shows load voltage and current waveforms for three phases with 60° power factor at load.

FIG. 9 shows the calculated $i_r$, $i_x$ and $i_m$ waveforms for phase 1 with $\theta = 60°$, which is the nominal power factor angle for the compressor motor. The sawtooth irregularities in $i_m$ follow from the superposition of the stepped $i_r$ waveform with the smooth $i_x$ waveform. This characteristic is borne out in the actual inverter, both when driving a dummy reactive and resistive load and when driving the compressor motor. In FIG. 10 the calculated $i_m$ and $V_m$ waveforms are shown for all three phases with $\theta = 60°$.

The resultant load currents $i_{m1}$, $i_{m2}$ and $i_{m3}$ flow through the secondary coils of the inverter as indicated in the FIG. 1 schematic. According to the ideal transformer model the currents in the primary coils are:

| | |
|---|---|
| $i_{a1} = (N_{sa}/N_{pa}) i_{m1}$ | $i_{b1} = (N_{sb}/N_{pb}) i_{m1}$ |
| $i_{a2} = (N_{sa}/N_{pa}) i_{m2}$ | $i_{b2} = (N_{sb}/N_{pb}) i_{m2}$ |
| $i_{a3} = (N_{sa}/N_{pa}) i_{m3}$ | $i_{b3} = (N_{sb}/N_{pb}) i_{m3}$ |

From these the currents in the primary leads are obtain according to:

| | |
|---|---|
| $i_{p1} = i_{b2} + i_{a1}$ | $i_{p2} = -i_{a1} - i_{b3}$ |
| $i_{p3} = i_{b3} + i_{a2}$ | $i_{p4} = -i_{a2} - i_{b1}$ |
| $i_{p5} = i_{b1} + i_{a3}$ | $i_{p6} = -i_{a3} - i_{b2}$ |

Figure 11:
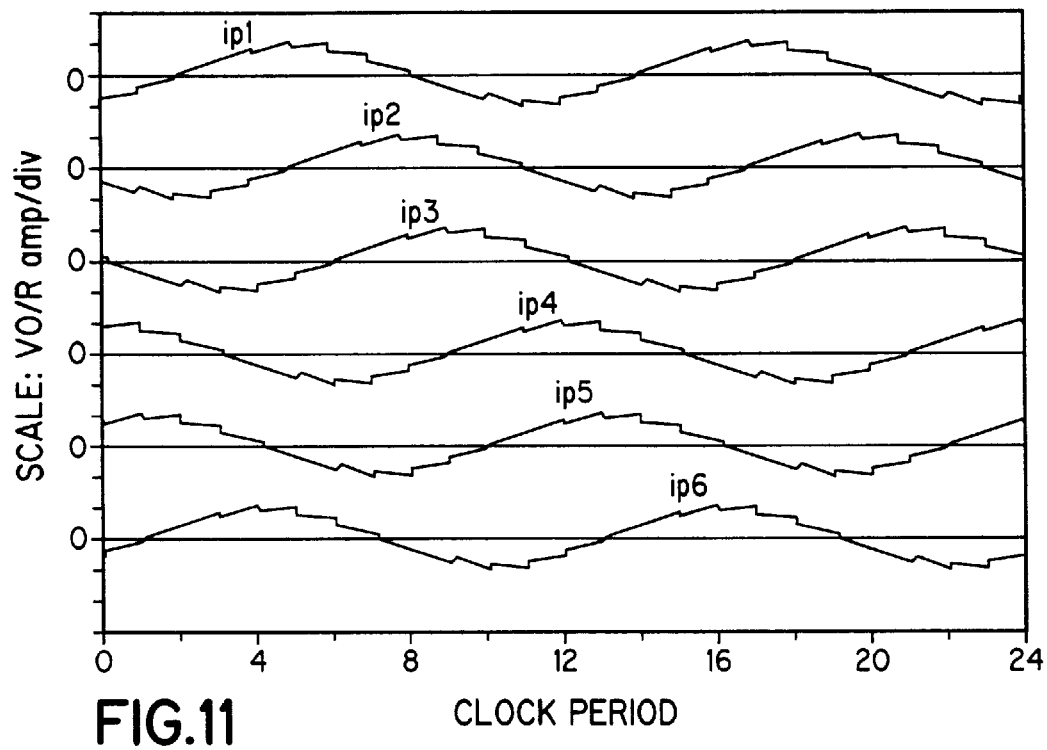
FIG. 11 shows current waveforms for primary coil leads with 60° power factor at load.

FIG. 11 shows the six waveforms obtained from the $i_m$ waveforms of FIG. 10.

Figure 12:
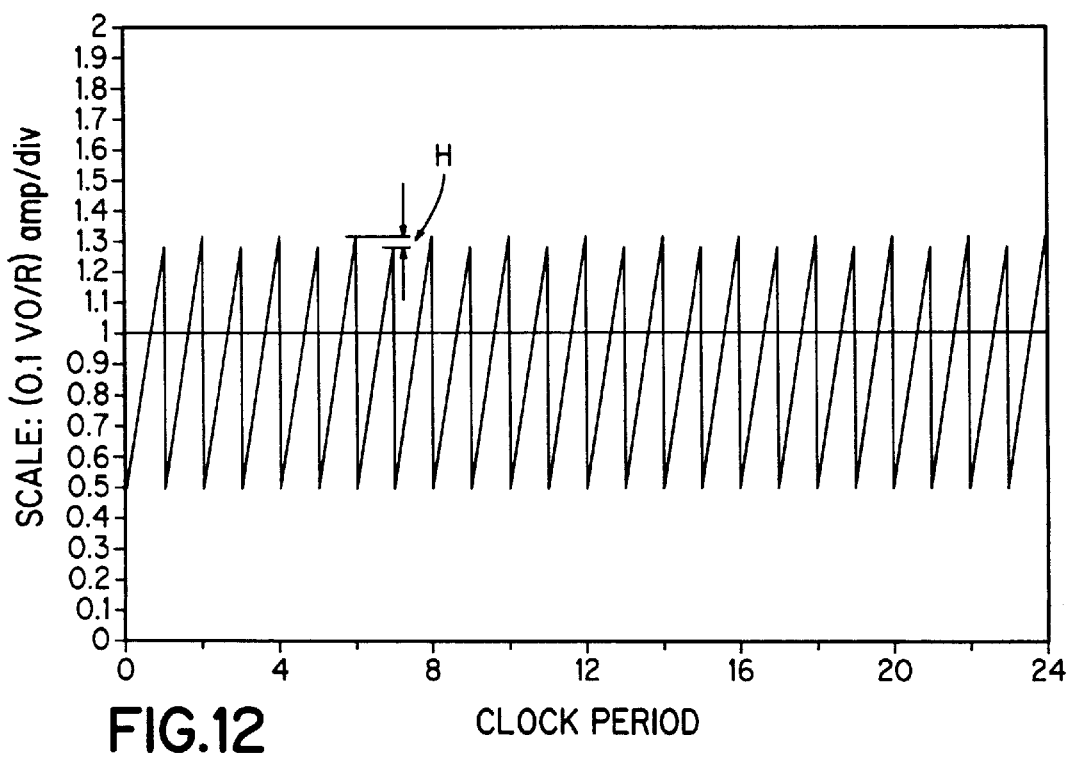
FIG. 12 shows total current to inverter from DC bus with 60° power factor at load.

The portion of the $i_p$ waveform where the corresponding $V_p$ waveform is at $V_0$ represents the current flowing from the DC supply to the inverter through that lead. By adding up these portions for the six $i_p$ waveforms, the total current flowing from the DC supply is obtained. FIG. 12 shows this total supply current calculated for the $i_p$ waveforms of FIG. 11. It is seen to consist of a DC component of approximately 0.9 $V_0/R$ amp, a sawtooth ripple at the clock frequency and a slight third harmonic ripple. The DC component of this supply current, which will be denoted as $i_0$, represents the input power $W_0$ to the inverter according to:

$$W_0 = i_0 V_0$$

The total output power $W_m$ delivered to the three load resistors is:

$$W_m = (3/2) V_{m0}^2 / R$$

In the present analysis $W_m = W_0$ since inverter loss is not included, resulting in $i_0 = W_m/V_0$. From Equation (1) with $N_{sa}/N_{pa} = 2/3$ and $N_{sb}/N_{pb} = 1/2$, $V_{m0} = 0.778\ V_0$, providing $i_0 = 0.908\ V_0/R$ as shown by FIG. 12.

The sawtooth ripple on the input current in FIG. 12 is a 12th harmonic of the inverter frequency. This is readily eliminated in practice by placing a small filter capacitor (2.2 microfarad) across each pair of MOSFET switches between $V_0$ and ground. The unfiltered 12th harmonic ripple is associated with the phasing between the $V_p$ and $i_p$ waveforms. The amplitude of this ripple can be shown to be a maximum when the load is purely reactive ($V_p$ and $i_p$ are 90° out of phase) and a minimum when the load is purely resistive ($V_p$ and $i_p$ are in phase).

The difference H in height between the adjacent sawtooth peaks in FIG. 12 represents the amplitude of the third harmonic ripple that would remain after the sawtooth is filtered out. This can be seen to be 1 to 2% of the DC current, making the resultant disturbance fed to the 28 volt DC bus by the inverter a 24 kHz current ripple whose amplitude is 1 to 2% of the DC current. The third harmonic ripple is caused by slight asymmetry in the $i_m$ waveform that results from superposition of the stepped resistive current waveform with the smooth reactive current waveform.

The preceding analysis has defined all voltage and current waveforms within the inverter. To summarize the results, it is useful to treat the $V_m$, $i_m$, $i_a$, $i_b$ and $i_p$ waveforms as pure sine waves with amplitudes $V_{m0}$, $i_{m0}$, $i_{a0}$, $i_{b0}$ and $i_{p0}$. In terms of $V_0$ and the turns ratios, the waveform amplitudes are:

$$V_{m0} = (2/3)[(N_{sa}/N_{pa}) + (N_{sb}/N_{pb})] V_0 \quad (14)$$

$$i_{m0} = V_{m0}/(R \cos \theta) \quad (15)$$

$$i_{a0} = (N_{sa}/N_{pa}) i_{m0} \quad (16)$$

$$i_{b0} = (N_{sb}/N_{pb}) i_{m0} \quad (17)$$

$$i_{p0} = (i_{a0}^2 + i_{b0}^2 - i_{a0} i_{b0})^{1/2} \quad (18)$$

The relation for $i_{p0}$ follows from the superposition of an $i_a$ and an $i_b$ waveform to form each $i_p$ waveform. It can be seen from the preceding analysis of the current waveforms that each $i_p$ is formed from an $i_a$ and an $i_b$ that are 60° out of phase. The current amplitudes determine the resistive losses in the transformer coils and MOSFET's. The input DC current $i_0$ is determined by the input power $W_0$ according to:

$$i_0 = W_0/V_0 \quad (19)$$

$$W_m = (3/2) V_{m0}^2/R \quad (20)$$

Finally, to provide the $V_m$ waveform that best approximates a sine wave, the turns ratios should be selected according to:

$$N_{sa}/N_{pa} = 0.8660\ V_{m0}/V_0 \quad (21)$$
$$N_{sb}/N_{pb} = 0.6340\ V_{m0}/V_0 \quad (22)$$

The inverter specification is based on preliminary design point and efficiency target for the SSRB compressor and motor. The present specification is as follows:

| | |
|---|---|
| Output power | $W_m$ = 175 watt |
| Input DC voltage | $V_0$ = 28 volt |
| Output AC voltage | $V_{m0}$ = 21.2 volt |
| - line to neutral | (15 volt-rms) |
| Output frequency | f = 8 kHz |
| Power factor | $\cos \theta$ = 0.5 |
| Target Efficiency | $\eta_{inv} = W_m/W_0$ = 0.90 |
| Starting Condition | $V_0$ = 14 volts |
| | f = 4 kHz |

From the above voltage levels the ideal turns ratios are:

$$N_{sa}/N_{pa} = 0.8660 \times 21.2 \div 28 = 0.656.$$

$$N_{sb}/N_{pb} = 0.6340 \times 21.2 \div 28 = 0.480$$

These are rounded to the practically attainable values:

$$N_{sa}/N_{pa} = 2/3$$

$$N_{sb}/N_{pb} = 1/2$$

which for $V_0 = 28$ volts yields from the Equation (14):

$$V_{m0} = 2/3 \times (2/3 + 1/2) \times 28 = 21.8\ \text{volts}$$

The equivalent load resistance R, for one phase, can be calculated from Equation (20):

$$R = 3/2 \times 21.8^2 \div 175 = 4.07\ \text{ohm}$$

The current amplitudes can now be calculated from Equations (15)–(18):

$$i_{m0} = 21.8 \div (4.07 \times 0.5) = 10.7\ \text{amp}$$

$$i_{a0} = 2/3 \times 10.7 = 7.13\ \text{amp}$$

$$i_{b0} = 1/2 \times 10.7 = 5.35\ \text{amp}$$

$$i_{p0} = (7.3^2 + 5.35^2 - 7.3 \times 5.35)^{1/2} = 6.43\ \text{amp}$$

Assuming the efficiency is 0.90, the DC current supplied by the bus at 28 volts would be:

$$i_0 = 175 \div 0.90 \div 28 = 6.94\ \text{amp}$$

These current amplitudes determine the resistive loss in the transformers and MOSFET's, whose designs for the breadboard inverter are discussed in the next two sections. Voltage and frequency determine the magnetic field which the transformers must be sized to carry. Since the existing breadboard compressor uses a primitive impeller design which has not been optimized, its compressor efficiency is much lower than the 40% target value for the SSRB. As a result, the breadboard inverter must supply substantially more power than 175 watts in driving the breadboard compressor at the SSRB design point flow and pressure ratio. The additional power increases the current in the transformers and MOSFET's from the above values, resulting in higher resistive loss and lower inverter efficiency. To enable the breadboard inverter to comfortably handle $W_m$ values up to 500 watts during testing, MOSFET's were selected with conservative current ratings and two were used in parallel for each switch. The point behind these variations illustrates the versatility of the present concept. The specification of the inverter components can be fitted to the requirements of varied compressor motors or other applications.

Ferrite toroids were used in the breadboard inverter, both for design conservatism and for convenience. Ferrites are dense homogeneous ceramic structures made by mixing iron oxide ($Fe_2O_3$) with oxides or carbonates of one or more metals such as manganese, zinc, nickel or magnesium. They are pressed, then fired in a kiln at 2000° F., and machined as needed to meet various operational requirements. Ferrites have inherently low core losses and high permeability at the 8 kHz design point frequency. They are inexpensive and readily available in a wide range of off-the-shelf sizes. Their main disadvantage relative to magnetic metals is their relatively low saturation flux density, typically around 0.4 tesla.

Other materials with varying conductivities may be used in accordance with the present invention.

Ferrite cores are available in a variety of geometries. The toroid is the most efficient magnetically, due to the absence of an air gap and a uniform cross-sectional area. Geometries other than the toroid, such as for bobbin wound coils and for convenient mounting to PC boards, are within the scope of the present invention. Given the present high current mode of operation, the transformer designs are driven, as is discussed below, to coils consisting of small numbers of turns of heavy gauge wire. Such coils are easily accommodated by the toroidal geometry.

To describe the process used in sizing the cores and coils and the resulting designs, the magnetic field will first be analyzed using Faraday's and Ampere's Laws. This will provide relations for the minimum number of primary turns and the minimum core cross-section based on a maximum allowable flux density. The selected coil and core designs which satisfy these constraints will then be shown. Finally the losses will be analyzed to demonstrate the suitability of the selected designs.

From Faraday's Law, the magnetic flux in the "a" and "b" transformer cores is determined by the primary coil voltage waveforms $V_a$ and $V_b$ according to:

$$\phi_a = (1/N_{pa}) \int V_a dt$$

$$\phi_b = (1/N_{pb}) \int V_b dt$$

The integration is readily carried out for the waveforms in FIG. 4 resulting in the peak values:

$$\phi_{a0} = V_0/(8fN_{pa})$$

$$\phi_{b0} = V_0/(24fN_{pb})$$

Figure 13:
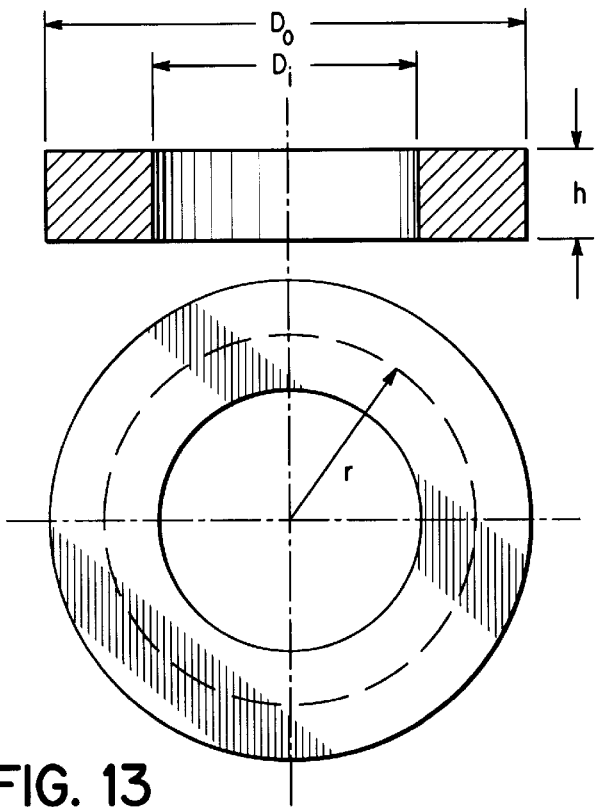
FIG. 13 illustrates geometry of toroidal core.

For the same number of turns, the "b" transformers carry one-third the flux of the "a" transformers. This is because the square pulses comprising the $V_b$ waveform are one-third the length of those comprising the $V_a$ waveform. FIG. 13 shows the geometry of the toroidal core. Through application of Ampere's Law to the circular path at radius r, it can be shown that the flux density B varies inversely with r according to:

$$B(r) = B_{max} D_i/(2r)$$

where $B_{max}$ is the maximum flux density. An expression for the flux in terms of $B_{max}$ is obtained by integrating this expression over the core cross-section:

$$\phi = (hD_i/2)B_{max} \ln(D_0/D_i)$$

Equivalently:

$$\phi = \beta A_{core} B_{max}$$

where:

$$\beta = [\ln(D_0/D_i)]/(D_0/D_i - 1)$$

and $A_{core}$ is the cross-sectional area. Equating this last expression for $\phi$ with the preceding expressions for $\phi_{a0}$ and $\phi_{b0}$ provides relations that can be used directly to size the cores:

$$(\beta A_{core})_a N_{pa} = V_0/(8fB_{max})$$

$$(\beta A_{core})_b N_{pb} = V_0/(24fB_{max})$$

To keep operating flux densities safely below saturation, a nominal $B_{max}$ of 0.25 tesla has been used to guide the design process. If $B_{max}$ is kept safely below saturation at the design point, there is room to use a higher value of $V_0/f$ during startup if needed. For $V_0 = 28$ volt, $f = 8000$ Hz and $B_{max} \leq 0.25$ tesla, these sizing relations give:

$$(\beta A_{core})_a N_{pa} \geq 17.50 \text{ cm}^2$$

$$(\beta A_{core})_b N_{pb} \geq 5.83 \text{ cm}^2$$

Clearly, for minimum size and weight, it is desirable that these $N_p$-core area products be as close to the minimum values as practical. If the minimum $N_p$-core area products are exceeded by the design, the operating $B_{max}$ value simply falls below 0.25 tesla, potentially reducing the core loss. This would in most cases be at the expense of increased coil resistance loss and increased weight. Since the specified currents are high and since core losses in ferrites are inherently low, the core size and numbers of turns were selected on the premise that the resistance loss in the coils would be the dominant loss. It was decided to use a small number of turns of heavy gauge wire, while satisfying the above minimum values for the $N_p$-core area products. Through an examination of the wide range of off-the-shelf toroids, two sizes were identified that satisfied the above minimum values with reasonable $N_p$ values. Key quantities defining these toroids are listed in Table 1.

TABLE 1

Selected Toroids and Numbers of Turns

| | Transformer "a" | Transformer "b" |
| --- | --- | --- |
| Magnetics Catalog No. | 43825-TC | 429154-TC |
| Material | J | J |
| $D_0$ (mm) | 38.1 | 29 |
| $D_i$ (mm) | 19.05 | 19 |
| h (mm) | 25.4 | 15.2 |
| $\beta A_{core}$ (cm$^2$) | 1.60 | 0.594 |
| $N_p$ | 12 | 10 |
| $N_s$ | 8 | 5 |
| $B_{max}$ (tesla) | 0.228 | 0.245 |
| Core Weight (g) | 103.4 | 27.6 |
| $V_{core}$ (cm$^3$) | 19.2 | 5.42 |

Although this selection does not reflect a rigorous optimization process, it probably represents the best combination of low loss and low weight that is attainable with off-the-shelf ferrite toroids. As this inverter concept advances toward flight hardware, it might be possible to gain significant weight reduction by using tape would toroids of high performance magnetic alloys. These would accommodate a higher $B_{max}$ which would allow smaller toroids to be used.

The selection of materials, however, does not limit the concept presented in the novel application.

The coils are wound from stranded hook-up wire with teflon insulation. The wire outer diameter is 3.4 mm and the resistance is 3.64 mΩ/m. Since the number of turns is small, each coil is wrapped tightly around the core in a single layer. The primary coil is wrapped directly around the core and the secondary coil is wrapped around the outside of the primary coil. Calculated coil lengths and resulting resistances are as follows. The lengths include a 6 inch leader at each end of each coil:

"a" Transformer—Primary $R_{pa} = 1.31 \text{ m} \times 3.64 = 4.77 \text{ m}\Omega$ "a" Transformer—Secondary $R_{sa} = 1.19 \text{ m} \times 3.64 = 4.33 \text{ m}\Omega$ "b" Transformer—Primary $R_{pb} = 0.844 \text{ m} \times 3.64 = 3.07 \text{ m}\Omega$ "b" Transformer—Secondary $R_{sb} = 0.710 \text{ m} \times 3.64 = 2.58 \text{ m}\Omega$ The $i^2R$ loss in each coil can be calculated from the current amplitudes.

"a" Transformer—Primary $W_{pa} = R_{pa} i_{ao}^2 / 2 = 0.00477 \times 7.13^2 \div 2 = 0.121 \text{ watt}$ "a" Transformer—Secondary $W_{sa} = R_{sa} i_{mo}^2 / 2 = 0.00433 \times 10.7^2 \div 2 = 0.248 \text{ watt}$ "b" Transformer—Primary $W_{pb} = R_{pb} i_{bo}^2 / 2 = 0.00307 \times 5.35^2 \div 2 = 0.044 \text{ watt}$ "b" Transformer—Secondary $W_{sb} = R_{sb} i_{mo}^2 / 2 = 0.00258 \times 10.7^2 \div 2 = 0.148 \text{ watt}$ Core loss density in mwatt/cm³ is specified as:

$P_c = K_c f^m B^n$ where f has units of kHz, B has units of kgauss and $K_c$, m and n are constants for a particular material. This expression is easily integrated over the toroid volume for the 1/r dependence of B, resulting in this expression for the total core loss:

$$W_{core} = \alpha V_{core} K_c f^m B_{max}^n \quad (23)$$

where $V_{core}$ is the core volume, specified in Table 1, and:

$$\alpha = \frac{2(D_i D_0)^2 [1 - (D_i D_0)^{n-2}]}{(n-2)[1 - (D_i D_0)^2]} \quad (24)$$

For Type J material:
 $K_c = 0.16$
 m=1.67
 n−2.532
The resulting core losses are:
 "a" Transformer
  α=0.387
  $W_{core\ a} = 0.387 \times 19.2 \times 0.16 \times 8^{1.67} \times 2.28^{2.532} \times 10^{-3} = 0.309$ watt "b" Transformer
 α=0.569
 $W_{core\ b} = 0.569 \times 5.42 \times 0.16 \times 8^{1.67} \times 2.45^{2.532} \times 10^{-3} = 0.154$ watt Table 2 summarizes the losses:

TABLE 2

Transformer Losses for 175 watt Inverter Output

|  | Transformer "a" | Transformer "b" |
| --- | --- | --- |
| Primary $i^2R$ | 0.121 | 0.044 |
| Secondary $i^2R$ | 0.248 | 0.148 |
| Core | 0.309 | 0.154 |
| TOTAL | 3.678 | 0.346 |

For the six transformers, the total loss is 3.07 watts, which is only 1.8% of the 175 watt output. The dominant loss for the inverter will be the $i^2R$ loss in the MOSFET's which is described in the next section. These transformer designs show excellent efficiency based on these calculations. On this project they have been highly effective in demonstrating the large power transfer capability of this inverter concept. The emphasis for the transformers in the upcoming flight hardware development efforts will be to reduce their size and weight, probably by switching from ferrite to a tape wound magnetic alloy. This option should be explored at the earliest opportunity.

Figure 1B:
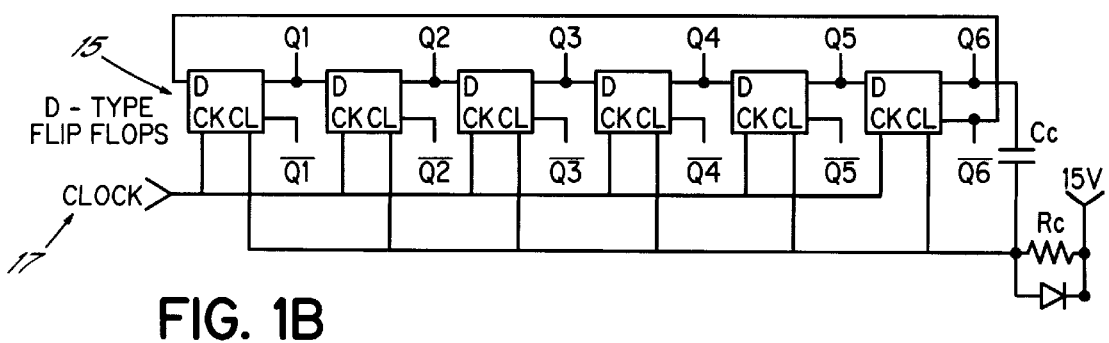
Figure 2:
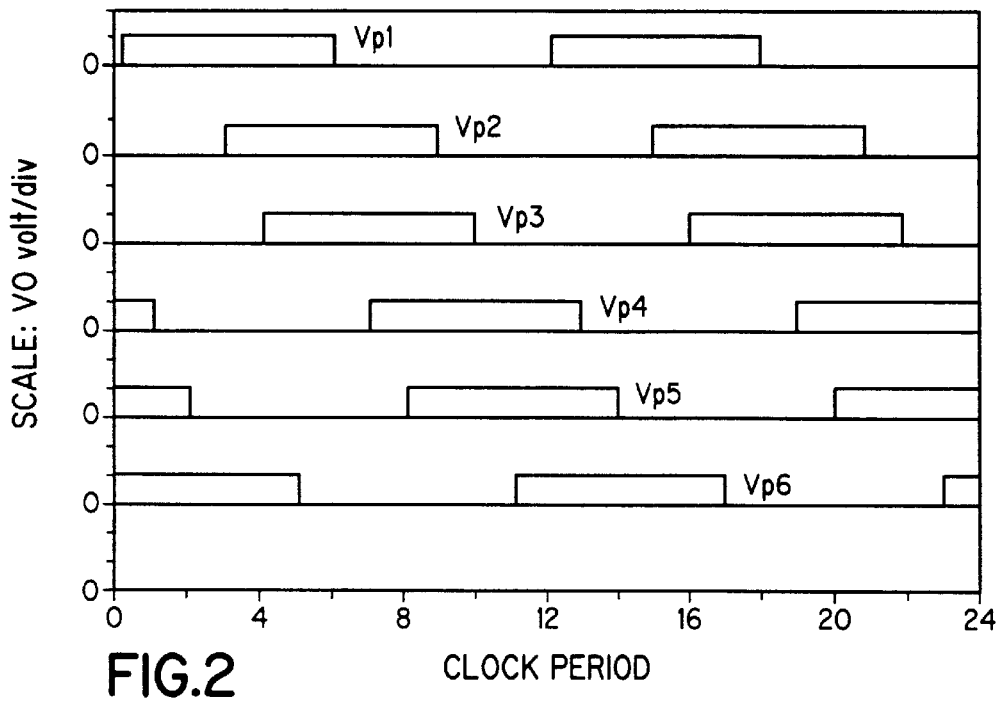
FIG. 2 shows voltage waveforms at primary coil leads.
Figure 3:
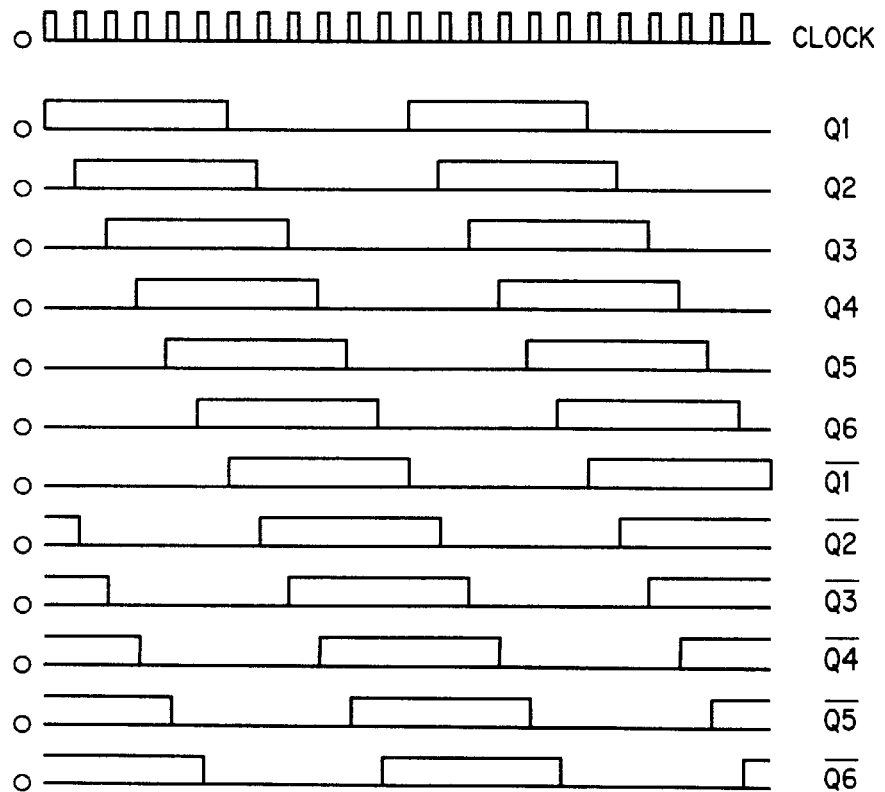
FIG. 3 shows logic output signals from D flip-flops.

Referring to FIGS. 1a, 1b and 2, the switching consists of the 6 MOSFET half-bridges with their IR2110 drivers, and the clock and D-type flip-flop elements that generate the logic Q and Q signals to trigger the IR2110 drivers. The complete switching circuit is very compact physically, consisting of the MOSFET's, six IR2110 chips, two D flip-flop chips and one timing chip for the clock.

The breadboard inverter uses International Rectifier IRF540 N-channel power MOSFET's for the primary switches. The IRF540 was selected for its high continuous current capacity, fast switching time and relatively low on-state resistance ($R_{ds}$). Drain-to source breakdown voltage is 100 volt, safely above the specified 28 volt value of $V_0$. Continuous rated current is 28 amp at 25° C., safely above the specified 6.43 amp value of $i_{po}$. Switching times, measured under actual operation of the breadboard inverter, are approximately 50 nanoseconds, resulting in negligible commutation loss. For the $V_p$ switching pattern, there is no diode conduction in the reverse direction, except possibly at the instant of switching, because either the high side or the low side MOSFET of each half bridge is turned on at all times. The avoidance of reverse conduction removes a significant source of switching loss.

The major MOSFET loss is that due to $R_{ds}$. For the IRF540 the maximum specified $R_{ds}$ is 0.077 ohm. For each MOSFET, considering the 50% duty cycle of $V_p$, this loss is:

$W_{rds} = i_{po}^2 R_{ds} / 4 = 6.43^2 \times 0.077 \div 4 = 0.796$ watt

For 12 MOSFET's this would total 9.55 watts, which is 5.5% of the 175 watt output. Each switch has two MOSFET's connected in parallel. This effectively decreases $R_{ds}$ by a factor of two, decreasing the total MOSFET loss to 4.78 watts, which is 2.7% of the 175 watt output. As well as reducing the loss, the use of two MOSFET's in parallel decreases the peak current carried by one MOSFET to 3.2 amp at the 175 watt inverter output, which is only 11% of the 28 amp rating. This is a comfortable margin of safety for the MOSFET's.

The IR2110 bridge driver has provided a convenient solution to the normally difficult problem of driving an N-channel MOSFET on the high side of a half bridge. A preliminary version of the circuit, which did not employ the IR2110, used a P-channel MOSFET on the high side. The disadvantage of this approach is the high $R_{ds}$ values characteristic of P-channel MOSFET's. For the IRF9540 P-channel MOSFET, which complements the IRF540, $R_{ds}$ is 0.2 ohm, almost three times the $R_{ds}$ of the IRF540. Since $R_{ds}$ dominates the inverter losses, the advantage of using N-channel MOSFET's is substantial.

Figure 14:
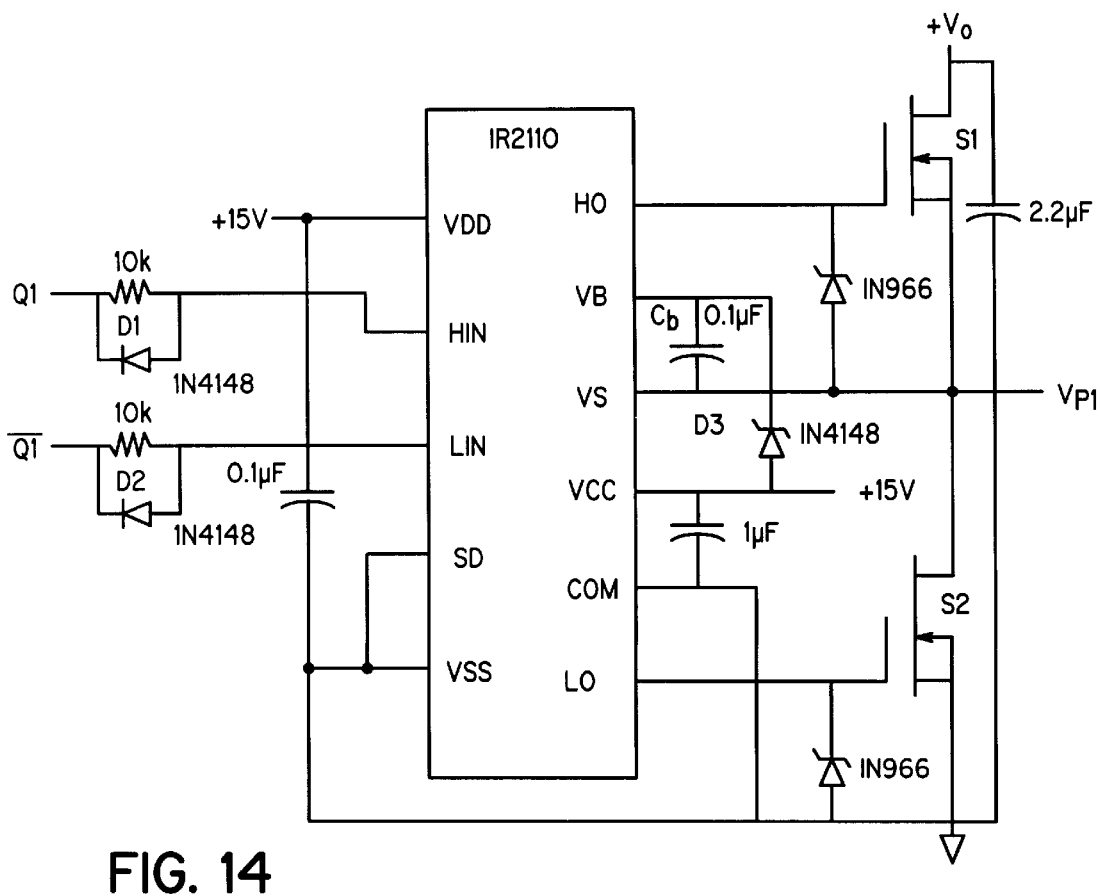
FIG. 14 shows a MOSFET half-bridge with IR2110 driver.

FIG. 14 shows a schematic of the $V_{p1}$ half bridge with the IR2110. The other five half bridges in FIG. 1 are identical to this one. The gates of the two MOSFET's are driven from the IR2110 outputs HO and LO which follow the logic signals at HIN and QIN. Driving the gate of the low side MOSFET (S2) is straightforward, since the source is at ground. On the high side (S1) the source floats at $V_{p1}$ so the IR2110 needs a floating supply voltage to switch to the gate. This is provided by the bootstrap capacitor $C_b$. When HO is low, $C_b$ is being charged through diode D3 from the 15 volt logic power supply. When HO is switched high, the voltage across $C_b$ is transferred from VB to HO. $C_b$ is sized to supply the required gate charge and to maintain the required gate-to-source voltage during the on time of S1. For the 4 to 8 kHz frequency range of the inverter, 0.1 µfarad has proven an adequate value for $C_b$. The required $C_b$ can become prohibitively large in low frequency applications, necessitating the use of a floating DC power supply between VB and VS.

Switching of S1 and S2 occurs nominally at the same instant. The falling edge of the Q1 pulse that turns S1 off is coincident with the rising edge of the Q1 pulse that turns S2 on and vice versa. As mentioned above, this mode of simultaneously switching the high and low MOSFET's avoids losses associated with body diode conduction, which occurs when the two MOSFET's are off at the same time for some portion of the cycle. The risk in simultaneous switching is short circuit current between $V_0$ and ground at the instant of switching, occurring if one MOSFET turns on slightly before the other one turns off. The resistor-diode networks at HIN and LIN avoid this occurrence by delaying the rising pulse edge that turns one MOSFET on relative to the falling pulse edge that turns the other one off.

Figure 15:
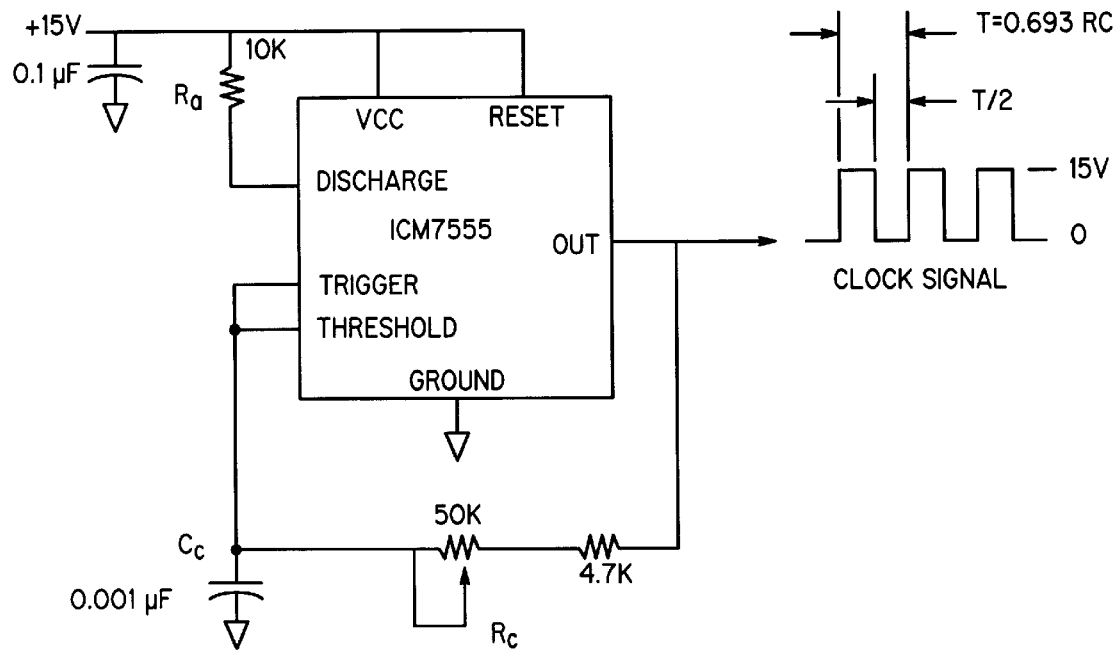
FIG. 15 shows an integrated circuit oscillator for clock signal.

FIG. 15 shows the oscillator circuit that provides the clock signal for generation of the Q and $\overline{Q}$ signals by the D flip-flops (FIGS. 1 and 2). The 555 timing chip, supplied with 15 volt DC, runs freely as a multivibrator, generating pulses of 50% duty cycle at the frequency:

$$f_c = 1.44/(R_c C_c)$$

The potentiometer for $R_c$ provides a convenient means of setting $f_c$ which is 12 times the inverter frequency. Over the full potentiometer range, $f_c$ ranges over approximately 24 to 120 kHz, corresponding to inverter frequencies of 2 to 10 kHz.

The transformer and MOSFET losses are calculated at the 175 watt specified design point for $W_m$ and are as follows:

| | |
|---|---|
| Total Transformer Core Loss | 1.39 watt |
| Total Transformer i²R Loss | 1.68 watt |
| Total MOSFET i²R Loss | 4.78 watt |
| Total Inverter Loss ($W_{inv}$) | 7.85 watt |

Efficiency of the inverter is:

$$\eta_{inv} = W_m/W_0 = W_m/(W_m + W_{inv}) = 175 \div (175 + 7.85) = 0.957$$

The effect of off-design operation on efficiency will now be analyzed. Since currents in the transformers and MOSFET's are proportional to $i_{m0}$, the total i²R loss for the inverter is proportional to $i_{m0}^2$. For any value of $i_{m0}$, the total i²R loss in watts, denoted by $W_{res}$, can be expressed as:

$$W_{res} = (1.68 + 4.78) \times (i_{m0} \div 10.7)^2 = 0.0565 \times i_{m0}^2 \quad (25)$$

where $i_{m0}$ has units of amps.

A similar off-design relation can be derived for the core loss, which from Equation (23) scales with:

$$W_{core} \cong f^m B_{max}^n$$

where m=1.67 and n=2.532 for Magnetics Type J material, $B_{max}$ scales with $V_0/f$, resulting in:

$$W_{core} \cong f^{m-n} V_0^n$$

scaling from the design point values:

$$W_{core} = 1.39 \times (f \div 8)^{-0.862} \times (V_0 28)^{2.532} = 0.00181 \times f^{-0.862} \times V_0^{2.532} \quad (26)$$

where f is in kHz, $V_0$ is in volts and $W_{core}$ is in watts. The total inverter loss, denoted by $W_{inv}$ is then calculated as:

$$W_{inv} = W_{res} + W_{core}$$

Finally, $W_m$ is calculated from:

$$W_m = (3/2) i_{m0} V_{m0} \cos \theta$$

where $V_{m0}$ is proportional to $V_0$.

Inverter efficiency can be written in the form:

$$1/\eta_{inv} = 1 + W_{inv}/W_m$$

If core loss is ignored, a reasonable approximation for the present design, the above equations for $W_{res}$ and $W_m$ can be substituted to give the approximate expression:

$$1/\eta_{inv} = 1 + 0.0251 W_m/(V_{m0} \cos \theta)^2$$

which to first order is equivalent to:

$$\eta_{inv} = 1 - 0.0251 W_m/(V_{m0} \cos \theta)^2$$

This shows the impact of off-design operation on efficiency of the inverter. At the design point, this equation gives:

$$\eta_{inv} = 1 - 0.0251 \times 175 \div (21.8 \times 0.5)^2 = 1 - 0.0370 = 0.963$$

If $W_m$ is increased by a factor of 2 at the same $V_{m0} \cos \theta$, the efficiency decreases to:

$$\eta_{inv} 1 - 2 \times 0.0370 = 0.926$$

representing a 4 point decrease. If $V_{m0} \cos \theta$ is decreased by a factor of 2 at the design $W_m$, the efficiency decreases more dramatically to:

$$\eta_{inv} = 1 - 0.0370 \times 4 = 0.852$$

representing an 11 point decrease. This illustrates the importance of matching the inverter design to the characteristics of the motor. Off design operation of the motor at either reduced voltage or reduced power factor has a strong negative impact on inverter efficiency. This comes into play at reduced frequency. Since the magnetic field in both the motor and the inverter is proportional to $V_{m0}/f$, $V_{m0}$ may have to be reduced to avoid saturation if f is reduced.

Saturation resulting from a failure to reduce $V_{m0}$ would carry the penalty of an even more severe reduction in cos θ, which would be the manifestation of a sharp increase in $i_{m0}$.

Figure 16:
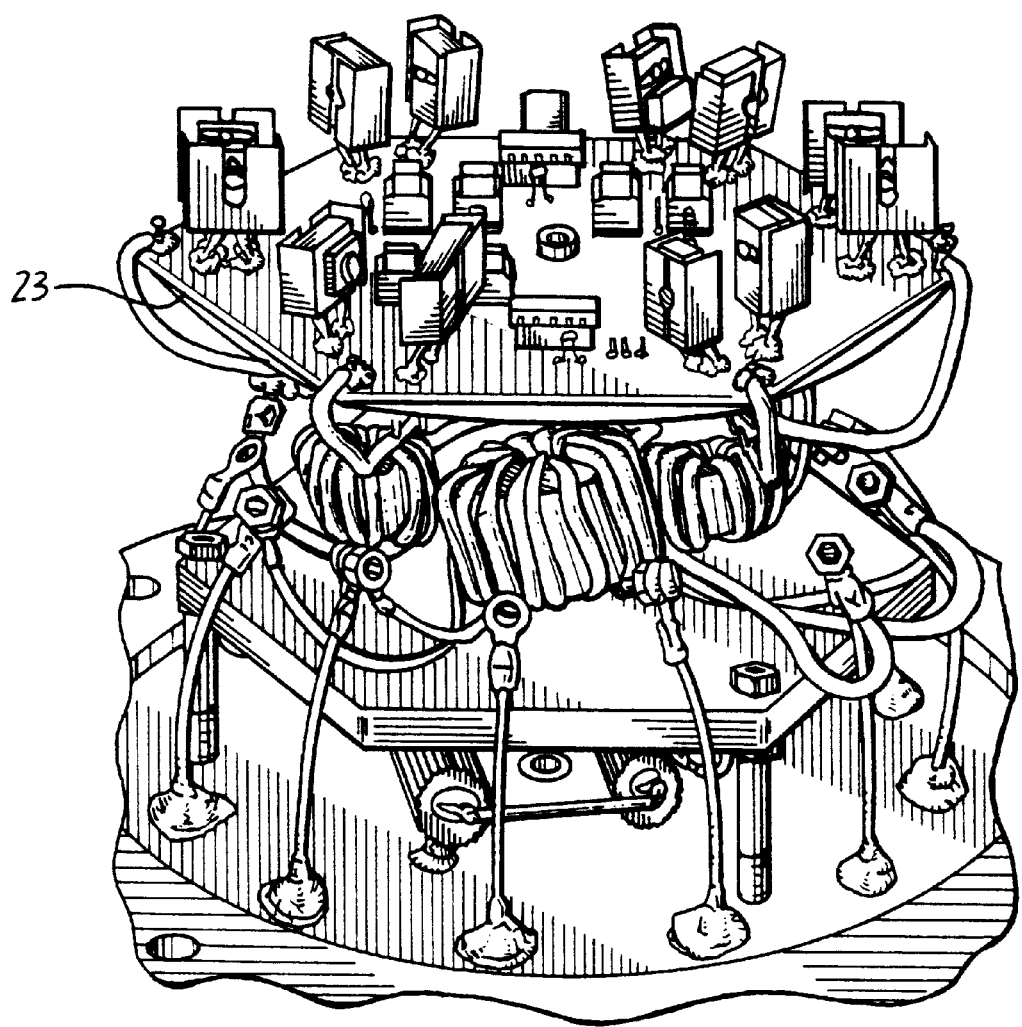
FIG. 16 is a top view of a breadboard inverter.
Figure 17:
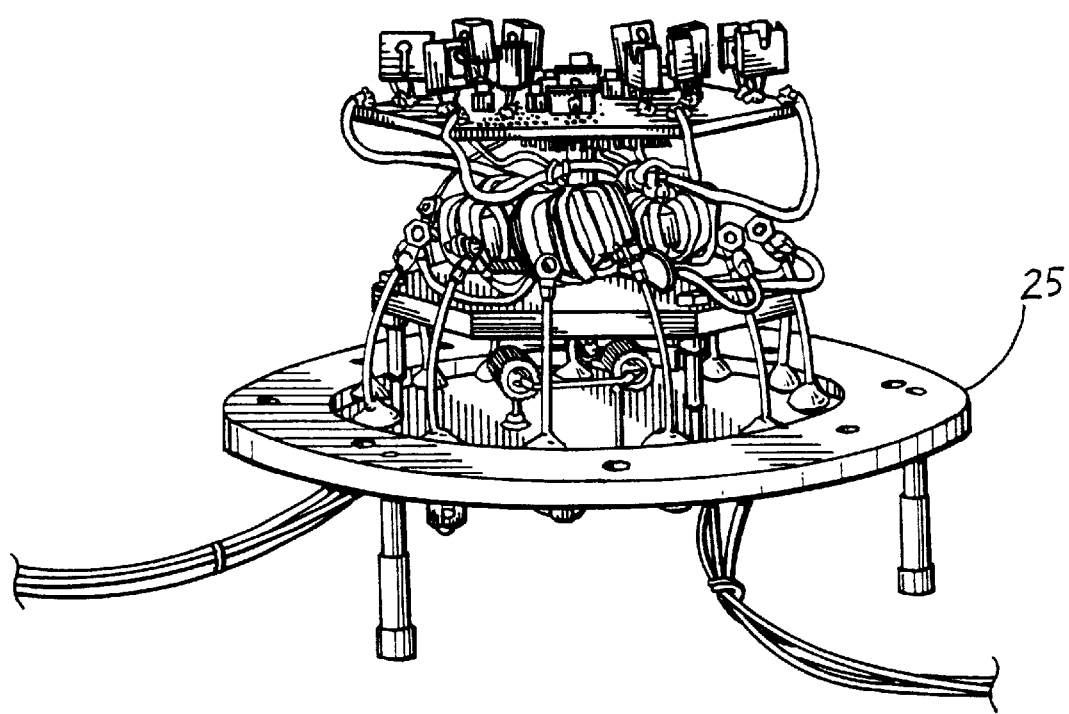
FIG. 17 is a side view of the breadboard inverter.

The inverter, shown by photographs in FIGS. 16 and 17, has a perforated wire wrap board 23 containing all of the electronic components, including the MOSFET's and drivers, with the six toroidal transformers clustered beneath the board. The board is hexagonal in shape, with a diagonal extent of 7.25 inch. Logic components are wire wrapped, but the MOSFET and transformer terminals are soldered. To minimize noise which takes the form of spikes at the $V_p$ pulse edges, care was taken to make the leads between the MOSFET's and the $V_0$ and ground rails as short as possible. This makes the lead inductance as low as possible.

Each of the twelve switches of two paralleled MOSFET's was constructed as a module with a through bolt connecting the MOSFET cases to a small aluminum spacer block and a pair of heat sinks. The six high side and low side switch pairs occupy the vertices of the hexagonal board as shown by FIG. 16. The $V_0$ and ground power rails run along the periphery of the board on the underside, straddled by the MOSFET leads so as to minimize the length of those leads. The rails consist of lengths of hook-up wire and appear in FIG. 16 as short jumpers around the board vertices, connecting the output terminal of each pair of switches to the ring of primary coils on the underside. The remaining electronics of the IR2110 bridge drivers, two D-type flip-flop chips, the 555 timing chip, and their associated discrete components, occupy the interior of the hexagon. The six 2.2 μfarad filter capacitors, one for each pair of MOSFET switches, are soldered between the two rails on the underside. An additional filter capacitor is placed across the rail terminals.

A commercial implementation of the inverter would use the same general architecture, with the above arrangement of components incorporated on a single PC board.

Figure 18:
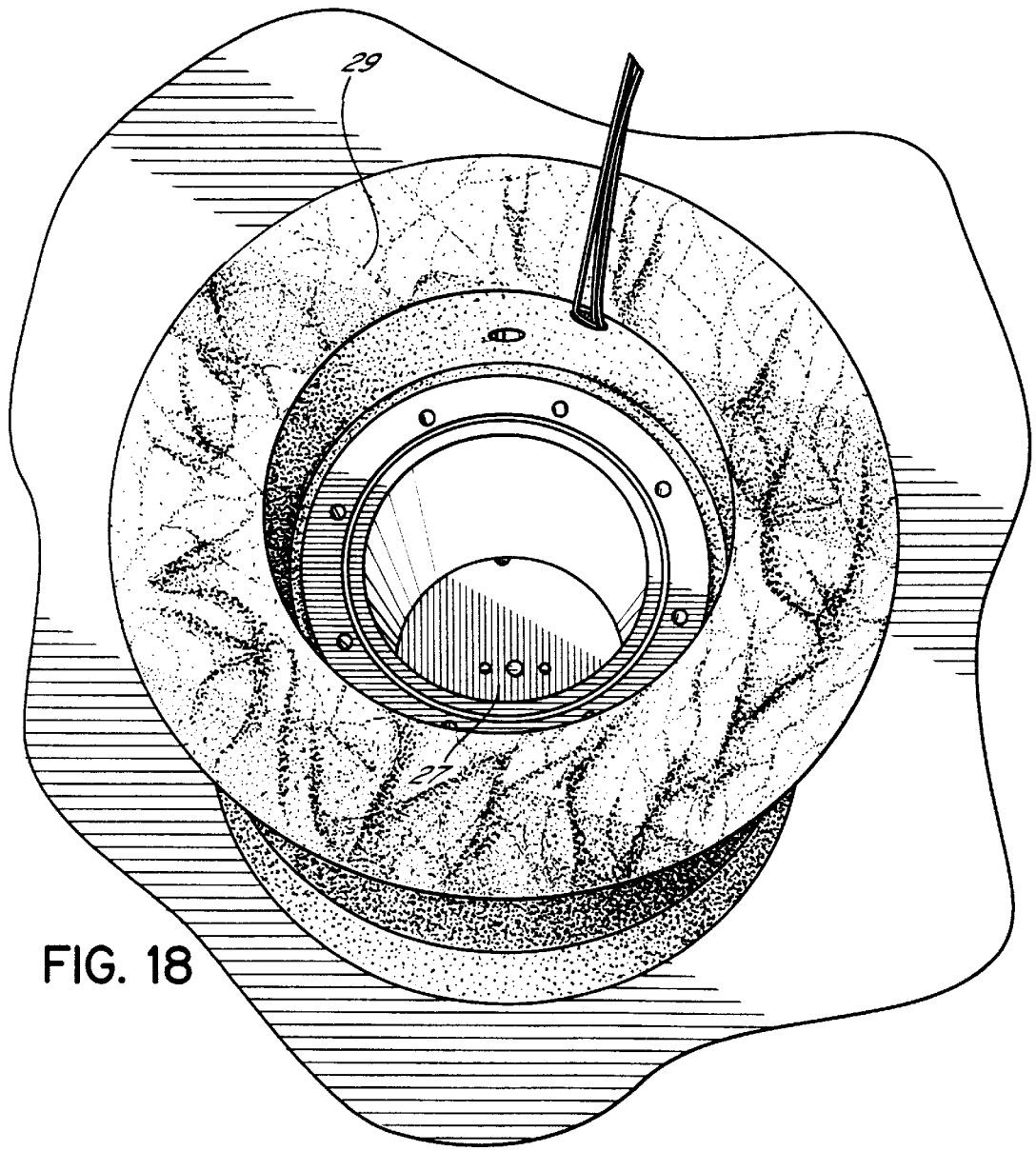
FIG. 18 shows a calorimeter vessel for a breadboard inverter.
Figure 20:
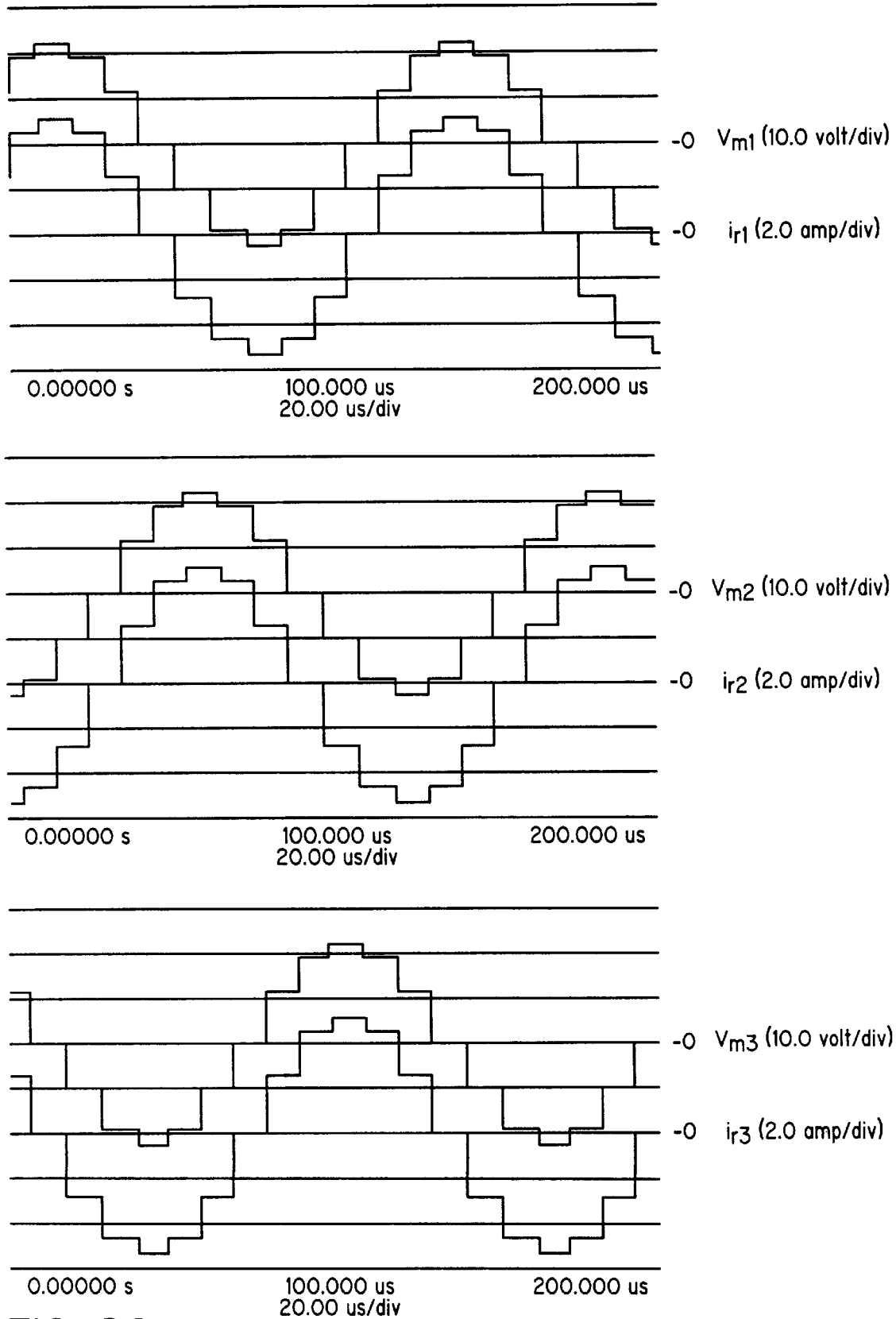
FIG. 20 shows measured load voltage and resistive current waveforms for a breadboard inverter with dummy load.
Figure 21:
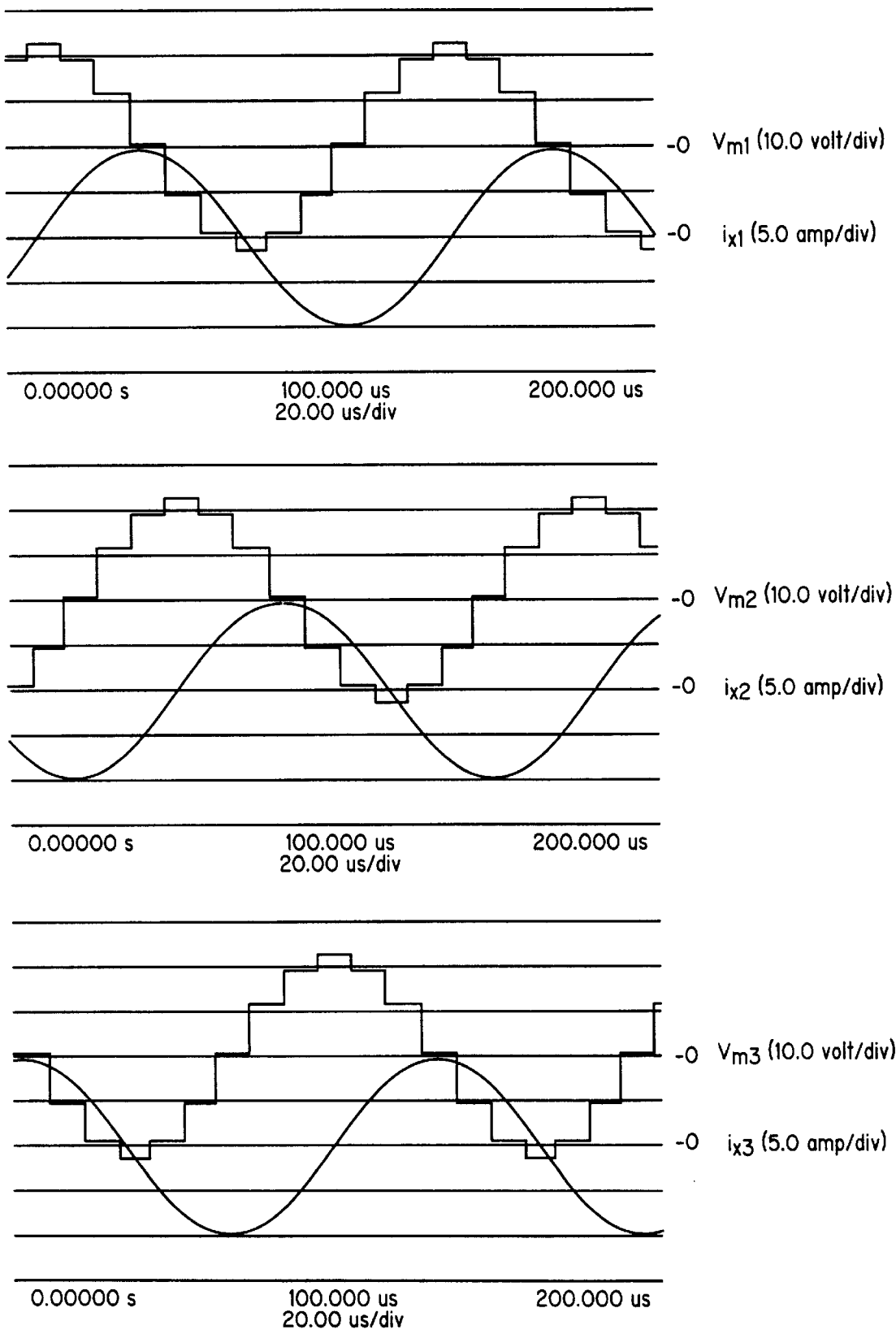
FIG. 21 shows measured load voltage and reactive current waveforms for a breadboard inverter with dummy load.
Figure 22:
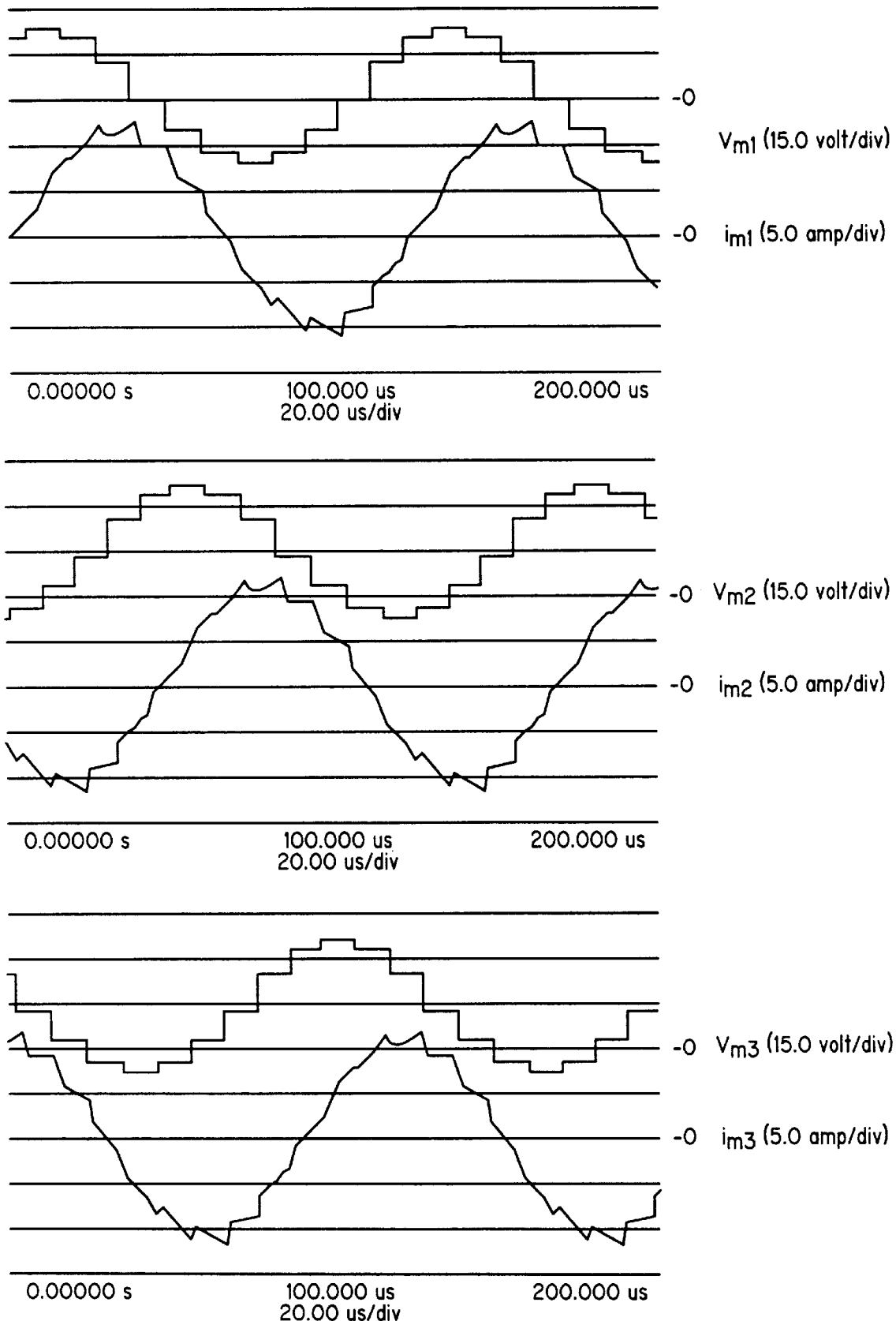
FIG. 22 shows measured load voltage and total current waveforms for a breadboard inverter with dummy load.
Figure 23:
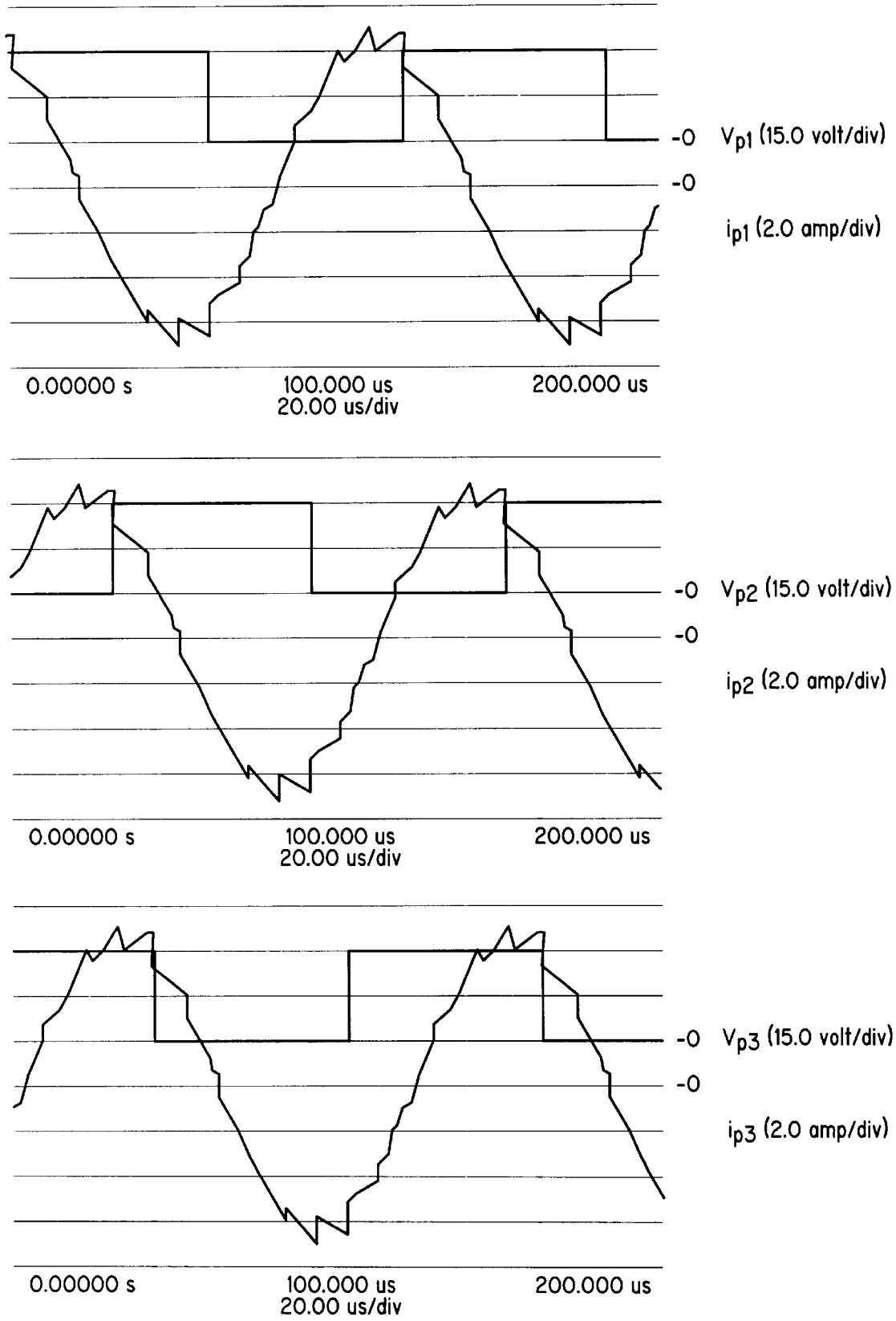
FIG. 23 shows measured voltage and current waveforms at primary leads 1–3 for the breadboard inverter with dummy load.
Figure 24:
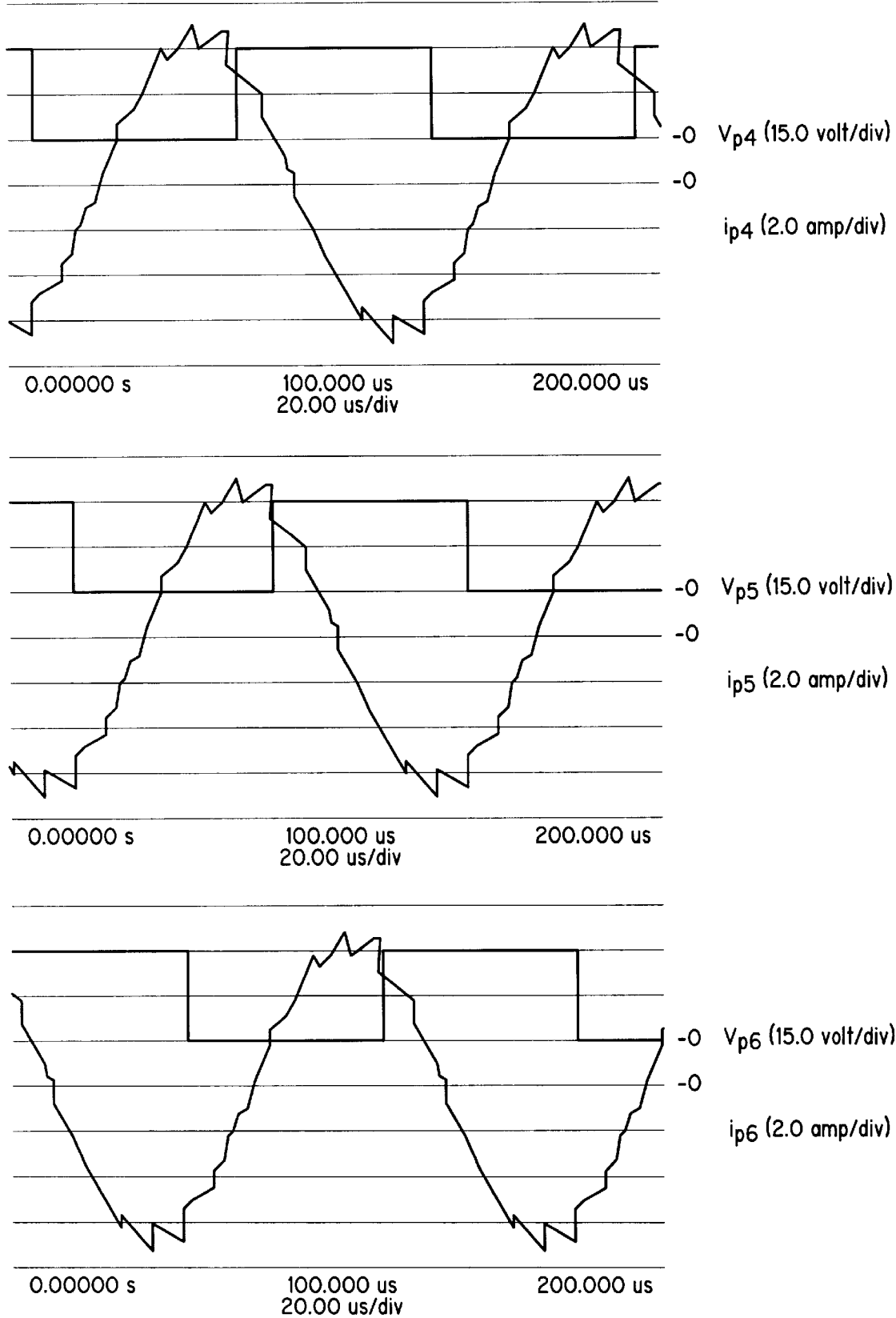
FIG. 24 shows voltage and current waveforms at primary leads 4–6 for the breadboard inverter with dummy load.

The aluminum plate 25, to which the inverter assembly is mounted, is the base of a freon calorimeter vessel which was used to verify the inverter loss calculations of the preceding sections. FIG. 17 shows this base plate. FIG. 18 shows the cylindrical vessel 27 which fits over the inverter and bolts to the base plate. Inside the vessel the inverter is immersed in liquid freon. Urethane foam insulation 29, approximately 4 inches thick, surrounds the vessel on all surfaces. When the inverter is operating at steady state, the boil off rate of the liquid freon provides a measure of the total inverter loss.

Operating procedures and results with the calorimeter are described below.

Based on the foregoing descriptions of inverter operation, there are two controllable variables that can influence the output voltage waveform. These are the DC input voltage $V_0$, which governs the output amplitude $V_{m0}$ according to:

$$V_{m0}=(2/3)[(N_{sa}/N_{pa})+(N_{sb}/N_{pb})]V_0$$

and the clock frequency $f_c$ which governs the output frequency f according to:

$$f=f_c/12$$

Given that $V_0$ is maintained by the DC power source, the current waveforms are governed by the output impedance which depends on the motor's load and operating characteristics.

Strategy for control of the inverter is dictated by the anticipated modes of operation of the SSRB cryocooler. This embodiment envisions a single operating speed for the compressor, corresponding approximately to the specified 8 kHz frequency of the inverter. The frequency can be varied by varying the potentiometer setting that determines $R_c$ in the clock circuit. A fixed trim pot can be incorporated to fix $R_c$ for normal operation. For starting, a logic command to the clock circuit would switch a higher resistance value into the $R_c$ network to provide a lower frequency on the order of 4 kHz. After allowing sufficient time for the compressor to reach 4 kHz, a second logic command switches the normal resistance value into the $R_c$ network.

With the inverter frequency fixed, the compressor's rotational speed is governed by the voltage amplitude $V_{m0}$ applied to the induction motor. From a control standpoint, variation in $V_{m0}$ is undesirable because the accompanying variation in rotational speed would change the thermodynamic operating condition of the compressor. Based on the compressor tests, the maximum tolerable variation in $V_{m0}$ is typically ±2%. Since $V_{m0}$ is proportional to $V_0$, the tolerance on $V_0$ is ±2%.

In testing the inverter and compressor, DC power was provided by a high quality commercial DC supply for laboratory or industrial use, which allows $V_0$ to be set manually and holds the setting within a regulation of 0.05%. In a spaceflight application, the inverter is nominally required to accept power from an unregulated DC bus whose voltage can vary over 28±6 volts. A pre-regulator is needed to supply DC voltage to the inverter within a ±2% tolerance. A boost mode DC-to-DC converter with no transformer isolation would be suitable. (Transformer isolation of the motor from the bus is provided by the inverter itself.)

Figure 19:
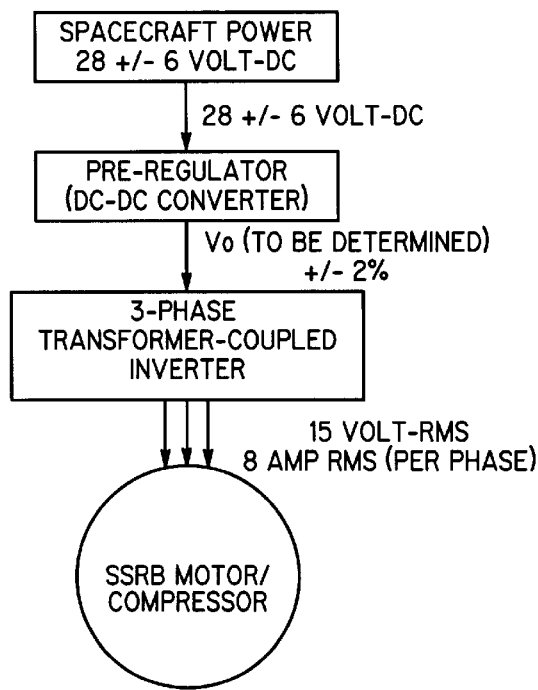
FIG. 19 is a schematic of an SSRB power system with pre-regulator.

FIG. 19 shows a schematic of the electrical power system for the SSRB cryocooler incorporating a pre-regulator with an unconditioned 28 volt bus. Although $V_0$, which is the output voltage of the pre-regulator, was specified as 28 volts for the breadboard inverter design, it is left unspecified in this schematic. There will be a power loss in the pre-regulator and $V_0$ should be selected so as to minimize the combined loss of the inverter and pre-regulator. The inverter design concept allows a wide latitude for the selection of $V_0$. For a given ratio $V_{m0}/V_0$, the transformer turns ratios are simply selected according to Equations (21) and (22). For the same power, for example, an inverter designed for $V_0$=56 volts, as opposed to 28 volts, would have one-half the primary lead current amplitude $i_{p0}$. MOSFET loss would be reduced by a factor of 4, offsetting some of the pre-regulator loss.

In power systems envisioned for future scientific space platforms, regulated DC power at 100 to 120 volts would be available, possibly making a pre-regulator unnecessary. An inverter designed for this DC input level would be highly efficient. At $V_0$=112 volts, for instance, $i_{p0}$ would decrease by a factor of 4 relative to 28 volts. The consequent decrease in MOSFET loss would be diminished slightly because MOSFET's with a higher voltage rating, which have a higher value of $R_{ds}$, would be needed. A suitable MOSFET is the International Rectifier IRF640. The drain-to-source breakdown voltage for the IRF640 is 200 volts, and the maximum $R_{ds}$ is 0.18 Ω, compared with 100 volts and 0.077 Ω for the IRF540. For the IRF640 with $V_0$=112 volts, MOSFET loss relative to the breadboard inverter would decrease by the factor:

$$0.18 \div 0.077 \div 4^2 = 0.146$$

Operation at higher values of $V_0$ is clearly beneficial for the inverter. Transformer losses do not change significantly with $V_0$, but, as just shown, MOSFET losses decrease substantially. Limitations on $V_0$ would be associated with losses in the pre-regulator, if one is needed.

A starting procedure for a flight unit is to switch the inverter on at a reduced voltage and frequency, wait a prescribed period of time to allow the compressor to accelerate from zero speed to this starting frequency, then switch to the design voltage and frequency. This procedure is completely open loop. The sequence of events is executed by simple logic elements incorporated in the inverter switching circuit. The only external communication to the inverter circuit would be a logic command to start or stop the inverter. The reduced starting voltage will be provided by a series resistance between the pre-regulator and inverter that is bypassed during normal operation.

No significant variation in the electrical load from the compressor motor is expected during normal operation. DC current drawn by the inverter will therefore be steady. Overcurrent protection of some form can be provided to protect the inverter and motor from unanticipated failure modes of the compressor.

It should be emphasized that the induction motor and inverter constitute a conventional open loop drive system. The control philosophy is to utilize this fact to the fullest in developing a system that is simple and robust with excellent potential for long term reliability.

In breadboard inverter tests, a standard dummy load of a parallel resistance and reactance for each phase was used throughout to evaluate the inverter at its various stages of development. FIG. 8 shows the configuration of this load, which simulates the specified 175 watt motor load at $V_0=28$ volt and $\theta=60°$. The load resistances have the value $R=4\,\Omega$. Each resistance consists of a bank of eight $2\,\Omega$ power resistors mounted to a large heat sink. Each load reactance consists of a 44.5 $\mu$h inductance, obtained from approximately 85 turns of stranded AWG-16 wire wound on a hollow plastic cylinder of 1 inch diameter by 7.5 inch length. For f=8 kHz, the actual reactance and power factor angle are:

$$X=2\pi\times 8000\times 44.5\times 10^{-6}=2.24\,\Omega$$

$$\theta=\mathrm{Tan}^{-1}(4\div 2.24)=60.8°$$

The measured resistance value for each inductor is:

$$R_x=0.143\,\Omega$$

For tests with the dummy load, input power at $V_0=28$ volt was provided by the power supply and the clock potentiometer was set for f=8 kHz. Voltage and current waveforms were recorded with a Digitizing Oscilloscope, a current probe and an amplifier. Input voltage ($V_0$) was measured with a digital voltmeter. This measurement is taken across the power rail terminals on the inverter circuit board so as to avoid any voltage drop along the power supply leads. Input current ($i_0$) was obtained by using a second digital voltmeter of the same model to measure the voltage drop across a precision 10 m$\Omega$ shunt resistor placed in series with one of the power supply leads. 15 volt biasing was provided for the logic components.

The measured DC input current for the dummy load test is:

$$i_0=6.83\,\mathrm{amp}$$

resulting in an input power of:

$$W_0=28\times 6.83=191\,\mathrm{watt}$$

A complete set of waveforms consisting of $V_m$, $V_p$, $i_r$, $i_x$, $i_m$ and $i_p$ is shown in FIGS. 20–24 for the three phases. In all cases, waveshapes can be seen to correspond closely to the calculated waveshapes. The predicted sawtooth irregularities in the $i_m$ and $i_p$ waveshapes are clearly exhibited by the measured waveshapes. Waveshape amplitudes agree well with values predicted from the Equations (14)–(18).

| | | |
|---|---|---|
| $N_{sa}/N_{pa}=2/3$ | $N_{sb}/N_{pb}=1/2$ | |
| $R=4\Omega$ | $\theta=60.8°$ | $V_0=28\,\mathrm{volt}$ |

Equations (14)–(18) predict:

$$V_{m0}=(2/3)\times(2/3+1/2)\times 28=21.8\,\mathrm{volt}$$

$$i_{m0}=21.8\div(4\times\cos 60.8°)=11.2\,\mathrm{amp}$$

$$i_{a0}=(2/3)\times 11.2=7.47\,\mathrm{amp}$$

$$i_{b0}=(1/2)\times 11.2=5.60\,\mathrm{amp}$$

$$i_{p0}=[7.47^2+5.60^2-7.47\times 5.60]^{1/2}=6.73\,\mathrm{amp}$$

while the measured waveforms show:
$V_{m0}=22$ to 23 volt
$i_{m0}=11$ to 12 amp
$i_{p0}=6$ to 7 amp Predicted inverter losses for this test can be obtained from Equations (25) and (26) for $W_{res}$ and $W_{core}$:

$$W_{res}=0.0565\times 11.2^2=7.09\,\mathrm{watt}$$

$$W_{core}=0.00181\times 8^{-0.862}\times 28^{2.532}=1.39\,\mathrm{watt}$$

$$W_{inv}=7.09+1.39=8.48\,\mathrm{watt}$$

This total loss is too small a value to be resolved by subtracting the calculated output power from the calculated input power. Consider the following estimate of output power for $i_{m0}=11.2$ amp:

| | |
|---|---|
| Load Resistors | $3\times 4\,\Omega\times(11.2\times\cos 60.8°)^2\div 2$ |
| | = 179 watt |
| Load Inductors | $3\times 0.143\,\Omega\times(11.2\times\sin 60.8°)^2\div 2$ |
| | = 20 watt |
| Total | $W_m=179+20=199\,\mathrm{watt}$ |

The apparent 8 watt gain over $W_0=191$ watt as opposed to an expected 8.5 watt loss reflects the uncertainty associated with the extraction of equivalent sine wave amplitudes from the real non-sinusoidal waveforms.

The freon calorimeter described in the next section was developed as a more certain means to verify the direct prediction of inverter losses. Based on the above direct calculations of $W_0$ and $W_{inv}$, the predicted inverter efficiency for the dummy load test is:

$$\eta_{inv}=(191-8.5)\div 191=0.955$$

For the present inverter project the tests had two objectives. The first was to demonstrate the capability of the inverter to drive the compressor at its design speed and load. The second was to demonstrate that the inverter can supply the maximum starting current drawn by the compressor's induction motor. Both objectives were successfully met by the tests. The follow gives descriptions of the compressor test facility, the inverter calorimetry experiments, the measured steady-state performance of the compressor and inverter over a wide range of conditions, and the measured start-up performance.

Figure 25:
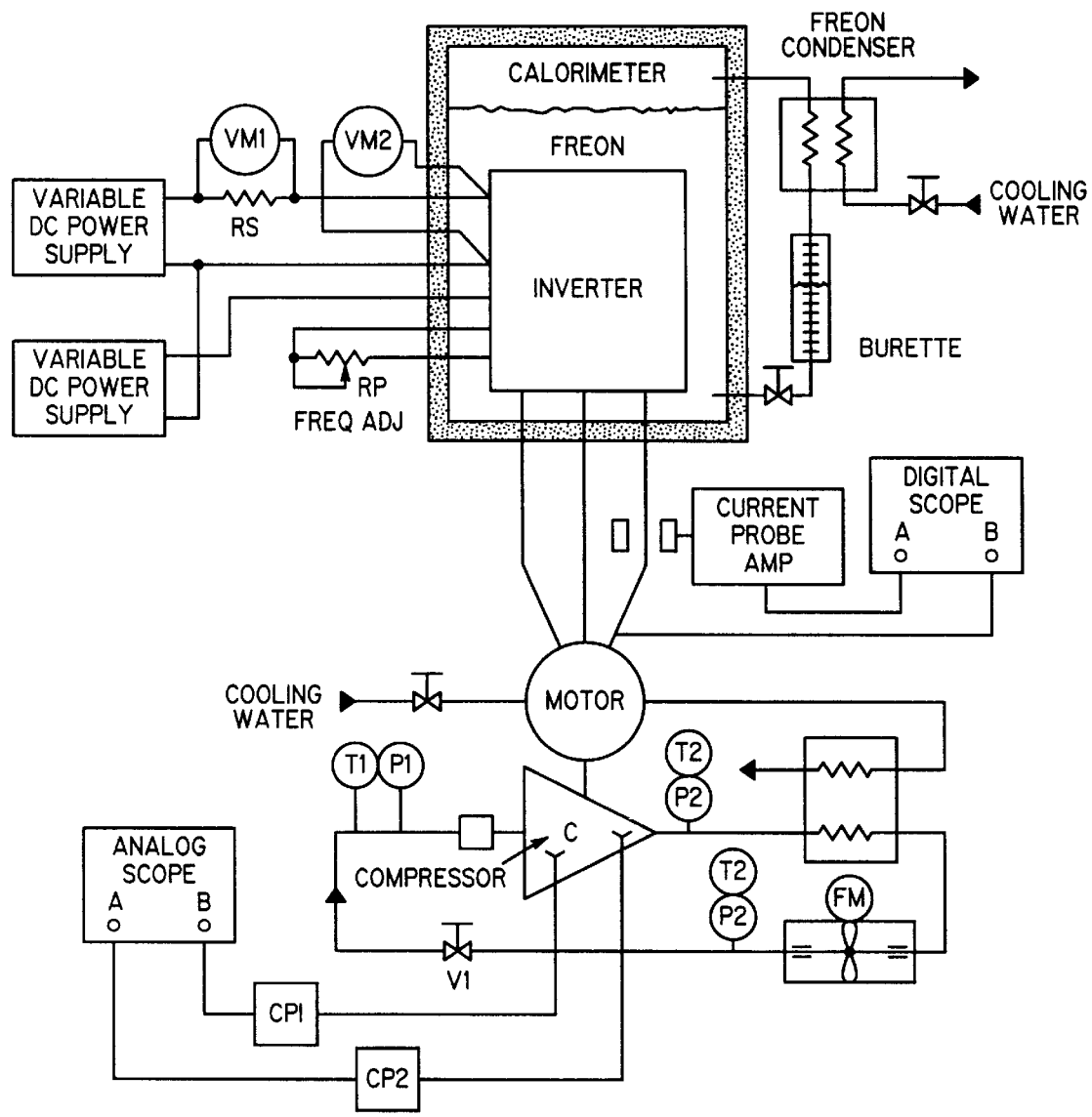
FIG. 25 illustrates a test facility for a SSRB compressor with a breadboard inverter.

FIG. 25 shows a schematic drawing of the compressor test facility, including the breadboard inverter and calorimeter. All inverter electrical measurements are for the dummy load tests. Instruments VM1 and VM2 are the digital voltmeters that measure $V_O$ and $i_O$. Resistors RS and RP represent the precision shunt for $i_O$ and the frequency adjusting potentiometer for the clock circuit.

All information on performance of the compressor is obtained from measurement of inlet pressure and temperature (P1, T1), exit pressure (P2), mass flow (FM, P3, T3), and shaft speed (CP2). Instrument FM is a turbine flowmeter which measures the volumetric flow rate leaving the compressor. Measurement of P3 and T3 provides the density at the flowmeter needed to determine the mass flow. CP1 and CP2 are capacitance probes which monitor radial position and rotational speed of the compressor shaft. The thermocouple, pressure transducer and flowmeter data were recorded through a data acquisition system.

The tests were run in air with the compressor inlet open to the atmosphere. A particular operating condition is fixed by the inverter frequency f, inverter input voltage $V_O$ and the amount of opening of the throttle V1 in the compressor exit line.

The calorimeter operates on the principle that all energy dissipated within the inverter is absorbed through boiling of the liquid freon in which it is immersed. Boil-off vapor exits the calorimeter vessel into a water-cooled condenser. The condensed vapor fills a graduated burette. The rate at which liquid fills the burette, as timed with a stop watch, determines the total inverter loss. This measurement is described in detail below.

The experimental calorimeter working fluid had key thermal properties listed in Table 3.

TABLE 3

Properties of Working Fluid

| | |
|---|---|
| Boiling Point at 1.0 atm | $T_{sat}$ = 23.82° C. |
| Liquid Density at 25° C. | $\rho_f$ = 1.476 g/cc |
| Sat. Vapor Density at Boiling Point | $\rho_v$ = 0.00586 g/cc |
| Heat of Vaporization at Boiling Point | $h_{fg}$ = 180.3 joule/g |
| Liquid Heat Capacity at 25° C. | $c_{pf}$ = 0.871 joule/g-°C. |

Equating total inverter loss to the rate of energy absorbed by boiling gives the relation $$W_{inv} = \rho_f Q_f h_{fg}$$

where $Q_f$ is the boil-off flow rate of liquid. From the values in Table 3:

$$Q_f[cc/s] = W_{inv}[watt]/(1.476 \times 180.3)$$

$$= W_{inv}[watt]/266$$

The burette, which captures the liquid boil-off, had a capacity of 50 cc and a height of approximately 54 cm. It was graduated in 0.1 cc increments, with approximately 1.08 mm between gradations. The operating procedure that evolved in shaking down the calorimeter apparatus was to record, using a stop watch, the time required for the liquid level to rise 10 gradations, or 1.0 cc. This time, denoted as $t_{cc}$, is the inverse of $Q_f$. The corresponding inverter loss is then given by:

$$W_{inv}[watt] = 266/t_{cc}[s]$$

The objective in shaking down the calorimeter was to ensure satisfaction of this relation under a known power input representing the variable $W_{inv}$. A bank of electrical resistors, immersed in the freon tank and driven from a DC power supply, provided the known power input. If this could be achieved, the above equation could be used confidently in determining an unknown $W_{inv}$ from a measured value of $t_{cc}$.

Successful operation of the calorimeter requires stable environmental conditions and low heat leak. These were achieved through thorough insulation of the vessel, the vapor exit line and the liquid return line. In using the calorimeter, the burette was kept approximately half filled at all times, cyclically letting the level rise for 5 to 10 cc as readings were taken and then dumping the 5 to 10 cc of liquid back into the vessel by opening a stop-cock at the bottom of the burette.

Despite the above efforts, the calorimeter still proved to be highly sensitive to small changes in environmental conditions, particularly changes in temperature of the room air or the condenser cooling water. Environmental changes would lead to condensation in the exit line or boiling in the return line, causing the measured burette fill rate to drift significantly. Significant progress was made in correcting these problems. Enough valid data points were acquired to establish confidence in the inverter loss models, but the danger of environmental drift and the need to allow significant time for readings to stabilize precluded use of the calorimeter for direct measurement of the inverter loss at each compressor test point. Inverter losses were instead calculated from the measured motor current and voltage.

The most convincing calorimeter data point was acquired in a test where the compressor was run from the inverter immediately following a period of stable performance of the calorimeter with a known 10 watt input and four successive readings of $t_{cc}$ ranging from 26.0 to 26.3 sec. The compressor was operated with the inverter set for $V_O$=15.6 volt and f=5 kHz, and a moderate throttle opening. The input current at this condition was $i_O$=7.7 amp, resulting in:

$$W_O = 15.6 \times 7.7 = 120 \text{ watt}$$

Figure 26:
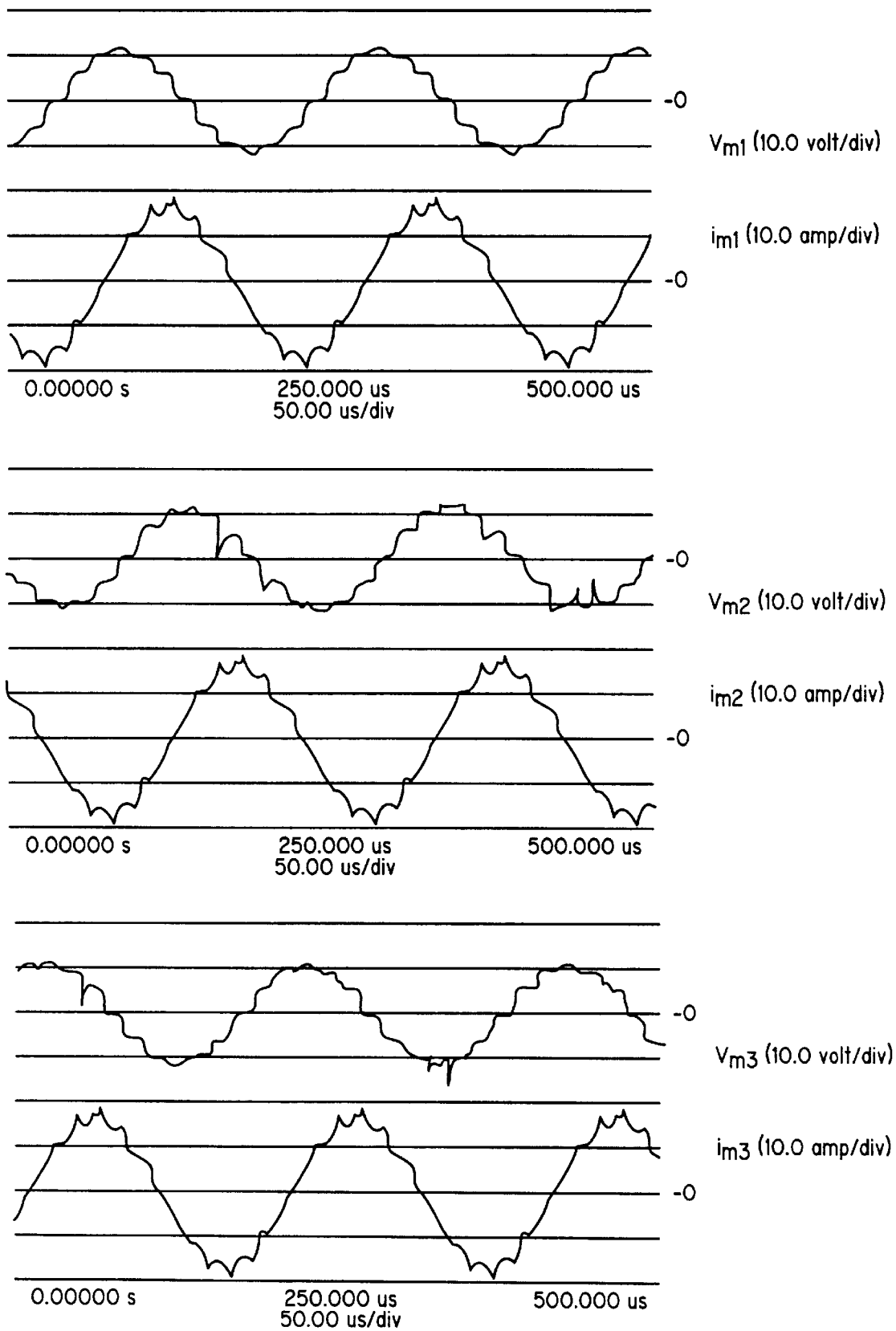
FIG. 26 shows measured motor voltage and total current waveforms for breadboard inverter from test of compressor and calorimeter: F=5 kHz; $V_O$=15.6; $i_o$=7.7 amp.

FIG. 26 shows the motor voltage and current waveforms for the three phases from which:

$$i_{m0} = 16 \text{ amp}$$

A succession of 10 burette readings ranged from 24.2 to 25.6 sec. Dividing these values into 266 gives a range of:

$$W_{inv} = 10.4 \text{ to } 11.0 \text{ watt}$$

For comparison, the losses can be calculated from Equations (11) and (12):

$$W_{res} = 0.0565 \times 16.0^2 = 14.46 \text{ watt}$$

$$W_{core} = 0.00181 \times 5^{-0.532} \times 15.6^{2.532} = 0.47 \text{ watt}$$

$$W_{inv} = 14.46 + 0.47 = 14.9 \text{ watt}$$

This predicted loss exceeds the calorimeter measurement by approximately 40%. Since the MOSFET's dominate the loss, and since the manufacturer's specified maximum value of $R_{ds}$ (0.077 Ω) is being used to calculate the loss, a measurement of the actual $R_{ds}$ value was made in situ to see if it could account for the discrepancy. This was done by separately supplying DC current from $V_O$ to ground through each pair of high and low MOSFET switches, and measuring the $V_O$ values for currents of 6, 8 and 10 amp. The switch pair being measured was turned on by supplying 15 volt DC to the gates. The other five switch pairs were off, making the switches being measured the only path from $V_O$ to ground. Since each switch is comprised of two MOSFET's in parallel, the effective combined resistance of the high and low switches is the average $R_{ds}$ of the four MOSFET's. Based on the $V_O$ value at 10 amp, the measured $R_{ds}$ value averaged over the six switch pairs is 0.046 ohm.

Using this measured $R_{ds}$ value, previously calculated MOSFET losses should be reduced by a factor of 0.046÷0.077=0.60. This should account for the 40% discrepancy. Equation (11) can be corrected as follows:

$$W_{res}=(1.68+4.78\times 0.60)\times (i_{m0}\div 10.7)^2=0.397\times i_{m0}^2 \quad (27)$$

The predicted inverter loss for this calorimeter data point now becomes:

$$W_{inv}=W_{core}+W_{res}=0.47+0.0397\times 16.0^2=10.6 \text{ watt}$$

This shows perfect agreement with the calorimeter measurement. On the basis of this agreement, Equation (12) for $W_{core}$ and Equation (27) for $W_{res}$ are used to calculate the inverter loss from the measured values of $i_{m0}$, $V_{m0}$ and f in the compressor tests described below.

Performance date were obtained at inverter frequencies of 5, 6, 7, 8 and 9 kHz over a range of throttle openings. For each combination of inverter frequency and throttle opening, readings were taken at three voltages to determine how slip of the induction motor influences performance of the motor and inverter. Shaft speed ($f_s$) and throttle opening fix the operating point of the compressor, which is represented by pressure ratio (PR), and mass flow (m). The relation between shaft speed and inverter frequency is represented by the slip parameter (s), defined as:

$$s=(f-f_s)/f$$

In conducting the tests, f and the throttle opening were fixed. As the motor voltage $V_{m0}$ was varied, $f_s$ varied within a small range slightly lower than f(s≦0.1). This variation in $V_{m0}$ and s had a weak influence on the compressor operating point through the small changes in $f_s$, but a stronger influence on the motor and inverter losses.

The matrix of test points covered a shaft speed ($f_s$) range of 4400 to 8600 rev/s, a mass flow (m) range of 0.3 to 1.7 g/s, and a pressure ratio (PR) range of 1.1 to 2.2. The isentropic enthalpy rise for the compressor at some inlet temperature $T_1$ and pressure ratio is given by:

$$H_s=c_p T_1(PR^{(\gamma-1)/\gamma}-1)$$

where $c_p$ is the constant pressure heat capacity and $\gamma$ is the ratio of the constant volume to constant pressure heat capacities. Output (useful fluid) power for the compressor is characterized by the isentropic compression power given by the product of m and $H_s$:

$$W_s=mH_s$$

A representative operating condition for the SSRB compressor with neon is:

$T_1$=284 K
PR=1.71
m=1.16 g/s
$P_1$=1.1 atm
$f_s$=7738 rev/s

These values are determined from the SSRB cycle model, and are based on cryocooler operation with 5 watts of cooling at 65 K with a heat rejection temperature of 280 K. For this condition, the preceding equations give:

$H_s$=70.0 j/g
$W_s$=84.0 watt (For air with $T_1$=293 K, the same value of $H_s$ would correspond to PR=2.12).

A good indication of the eventual performance of the present breadboard components in neon is provided by the data points for which $W_s$ is around 80 watts and $f_s$ is around 7000–8000 rev/s. The inverter specification, which represents the design goal for the system, provides a benchmark for evaluating this performance. According to that specification, power input to the motor at the design point is:

$W_m$=175 watt making the overall compressor-motor efficiency equal to:

$$W_s/W_m=84.0\div 175=0.48$$

Calculations of the inverter losses for $W_m$=175 watt at the specified electrical parameters. This calculation can be corrected for the measured MOSFET $R_{ds}$ to give:

$$W_{inv}=W_{core}+W_{res}=1.39+1.68+4.78\times 0.60=5.9 \text{ watt}$$

resulting in the following for inverter input power and efficiency:

$$W_0=W_m+W_{inv}=175+5.9=180.9 \text{ watt}$$

$$\eta_{inv}=W_m/W_0=175\div 180.9=0.967$$

Overall power train efficiency is:

$$\eta_s=W_s/W_0=84.0\div 180.9=0.46$$

In the spreadsheet calculations for each test point, $W_s$ was determined from m, PR and $T_1$ as described above, $W_0$ is given by the product of $V_0$ and $i_0$, and $W_{inv}$ is determined from $i_{m0}$, $V_{m0}$ and f through Equations (12) and (13), where Equation (13) accounts for the measured MOSFET $R_{ds}$. In addition the motor power factor is calculated from the relation:

$$\cos\theta=(2/3)W_m/(V_{m0}i_{m0})$$

Figure 27:
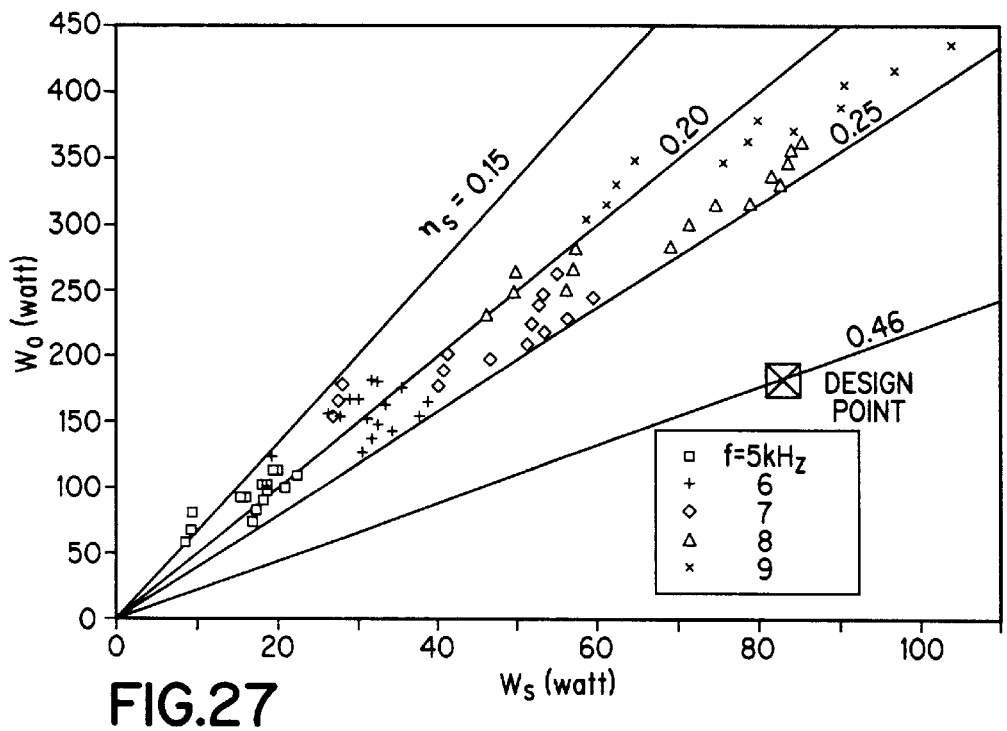
FIG. 27 shows isentropic compressor power ($W_s$) and inverter input power ($W_O$) for steady-state compressor test points at inverter frequencies (f) of 5–9 kHz.

FIG. 27 displays the test results as a plot of inverter input power $W_0$ and isentropic compression power $W_s$ for each test point, with the above design point and lines of constant $\eta_s$ shown for reference. Most of the data points fall between the 0.15 and the 0.25 $\eta_s$ lines. Data points near the design point $W_s$, which represent design point operation of the breadboard compressor, show $W_0$ values nearly two times the 180 watt design goal. This excess in $W_0$ is attributable mainly to high leakage and aerodynamic losses in the impeller, along with the additional motor and inverter losses incurred in carrying these excess impeller losses. As mentioned previously, the breadboard impeller design is preliminary and has not been optimized. Further development of the impeller is projected to reduce these losses, resulting in attainment of the $\eta_s$ target.

Figure 28:
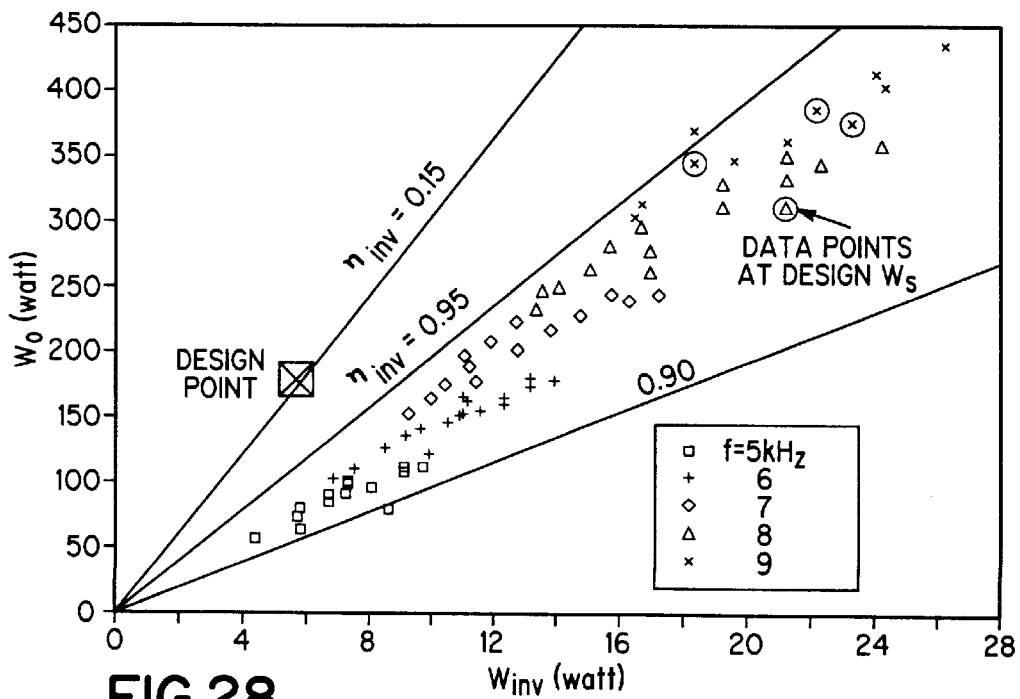
FIG. 28 shows calculated inverter loss ($W_{inv}$) and inverter input power ($W_O$) for steady-state compressor test points at inverter frequencies (f) of 5–9 kHz.

FIG. 28 shows a plot of the calculated $W_{inv}$ value vs. $W_0$ for each test point. The design point and lines of constant $\eta_{inv}$ are shown for reference. The following proportionalities describe the trends in $W_{inv}$ and $\eta_{inv}$ over the test matrix:

$$W_{inv} \simeq i_{m0}^2 \simeq W_m^2/(V_{m0}\cos\theta)^2$$

$$1-\eta_{inv}=W_{inv}/W_0 \simeq W_m/(V_{m0}\cos\theta)^2$$

$W_{inv}$ is small enough that $W_m$ and $W_0$ can be used interchangeably in describing trends in the data. At the data points for the design point isentropic compression power $W_s$ (circled), the inverter operated close to the specified values of $V_{m0}$ and cos θ, but $W_0$ was almost twice the design point value, as indicated above. This caused inverter losses to exceed the 6 watt design point value by approximately a factor of 4. Data points at the 180 watt design point inverter power correspond to speeds and isentropic compression powers that are much lower than the design point. Inverter loss exceeds the 6 watt design value at these data points as well, because the low electrical frequencies corresponding to the low speeds require the motor to run with lower $V_{m0}$ values to avoid saturation. These lower $V_{m0}$ values increase $i_{m0}$ and the inverter loss. Trends in inverter loss and efficiency associated with $V_{m0}$ and f are described further in the next few paragraphs.

Even though the low efficiency of the breadboard impeller caused the inverter loss to greatly exceed the 6 watt design point value, the inverter showed high efficiency over the full range of performance tests, falling between 90 and 95% as FIG. 28 shows. The inverter will show its design point loss and efficiency once improvements in impeller performance allow it to operate simultaneously at its specified frequency voltage, current and power factor:

$V_{m0}$=21.8 volt $i_{m0}$=10.7 amp $\cos \theta$=0.5 corresponding to $W_m$=175 watt.

The data points at fixed f and throttle opening with different $V_{m0}$ values show subtle but interesting effects on performance. As $V_{m0}$ is increased at fixed f and throttle, the motor magnetic field increases as long as it is below saturation. The increased magnetic field causes the shaft to speed up, decreasing s. An optimum value of $V_{m0}$ can be expected which gives the highest possible motor efficiency for the fixed f and throttle opening. This is apparent from a consideration of what happens when $V_{m0}$ is either too high or too low. If $V_{m0}$ is too high, high stator currents needed to generate the corresponding high magnetic field lead to excessive resistance loss in the motor stator. If $V_{m0}$ is too low, the slip can be excessively high, leading to high induced current and accompanying high resistance loss in the rotor. An even more important consequence of trying to operate with $V_{m0}$ too low is the potential for stalling of the motor.

The groups of data points at fixed f and throttle opening showed several examples of an optimum $V_{m0}$ value, represented by maxima in both $\eta_s$ and $\eta_{inv}$. Nearly all of the groups showed a decrease in efficiency from saturation at high $V_{m0}$. to avoid stalling from excessive slip, caution was always exercised in decreasing $V_{m0}$. For some of the groups, this caution prevented the reaching of a low enough $V_{m0}$ to get past the optimum point.

Figure 29:
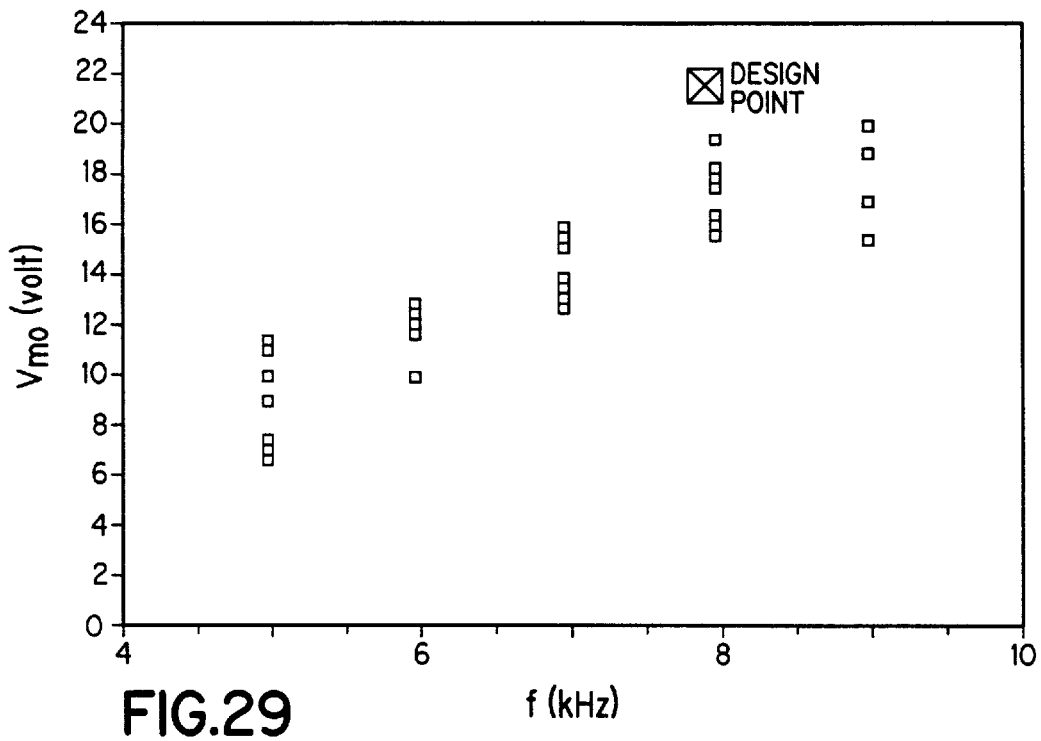
FIG. 29 shows motor voltage waveform amplitudes ($V_{m0}$) and inverter frequencies (f) for steady-state compressor test points.

The influence of $V_{m0}$ on motor performance is felt through its determination of the magnetic field, which scales with $V_{m0}/f$. An acceptable range of $V_{m0}$, over which the motor shows good efficiency, represents an acceptable range of magnetic field, extending from moderate slip at low magnetic field, to lower slip at higher magnetic field that is comfortably below saturation. Performance deteriorates at either excessive slip or saturation as stated above. FIG. 29 shows a plot of $V_{m0}$ vs. f for all of the test points, illustrating the upward trend of the $V_{m0}$ range with f that is expected in view of the $V_{m0}/f$ proportionality of the magnetic field.

Figure 30:
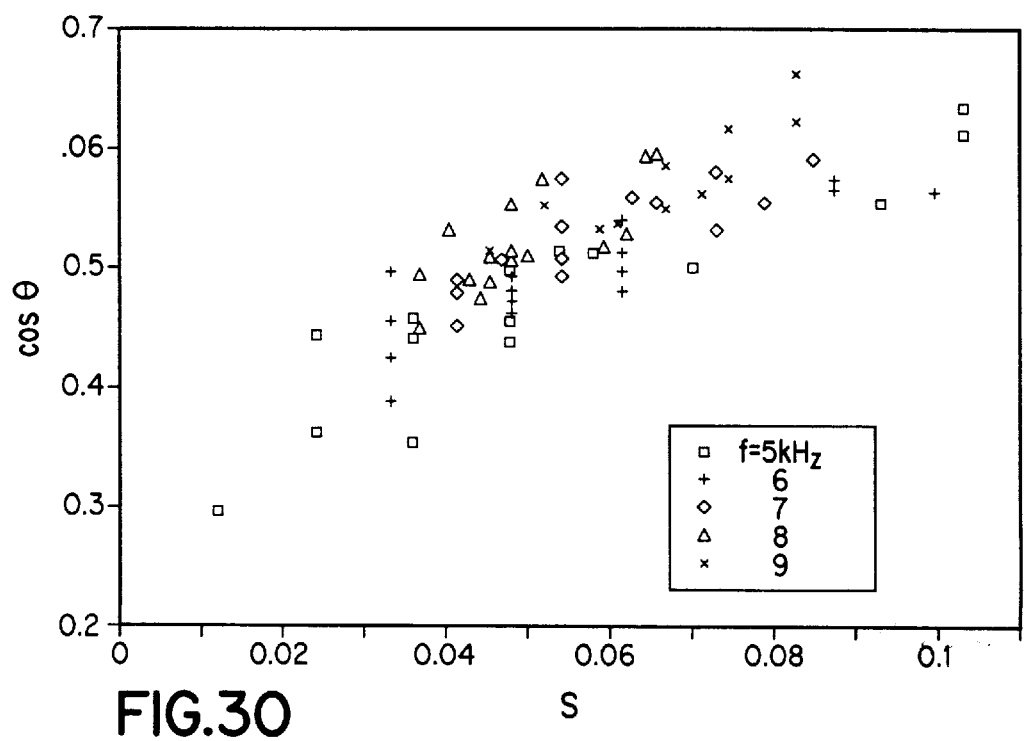
FIG. 30 shows power factor (cos θ) and induction motor slip (s) for steady-state compressor test points at inverter frequencies (f) of 5–9 kHz.

The opposite extremes of high slip and magnetic saturation, which give rise to excessive motor loss, are represented by higher than optimum motor currents. For a given motor power, these higher than optimum currents naturally reduce the inverter efficiency. At the magnetic saturation extreme, high magnetizing current in the stator decreases the power factor ($\cos \theta$) to produce higher than optimum motor current. At the high slip extreme, the magnetic field is low so magnetizing current in the stator is low, resulting in higher power factor. Despite favorable power factor, higher than optimum motor current is produced by the low values of $V_{m0}$. FIG. 30 shows a plot of power factor vs. slip for all of the test points. These data exhibit the monotonic trend of power factor with slip that has just been described.

The breadboard compressor used for the steady-state performance tests ran on externally pressurized gas bearings. The bearings were pressurized prior to start-up so there was no starting friction for the motor and inverter to overcome. In all of those tests, the machine was started by slowly increasing $V_0$ with the inverter frequency set for 5 kHz.

The compressor runs on self-acting tilt pad journal bearings. Dry contact between the shaft and the bearing pads at start-up results in a frictional force which must be overcome by the starting characteristics of the motor. In the absence of any large external radial loads on the shaft, this frictional force is very small. The torque needed to overcome it is much smaller than either the motor's operating torque at full speed or the torque absorbed by acceleration of the shaft following lift-off. Although this frictional torque prior to lift-off may normally be very small, the initial current at start-up can be substantial. At extremely low rotational speeds (high slip), the electrical impedance of the motor is at its minimum, resulting in high current, but the current is predominantly reactive, resulting in limited capability to produce torque. It is therefore important to ensure that the current needed to produce the required starting torque falls safely within the current ratings of the inverter MOSFET's.

Interest in the starting characteristics of the motor and inverter with tilt pad bearings is further motivated by difficulties that had been encountered in the early development of the breadboard compressor. In early tests performed with a commercial inverter, high radial forces from a permanent magnet thrust bearing prevented consistent smooth starting of the tilt pad bearings. The pressurized bearings were then implemented as an interim fix. A key objective of the present tests was to re-examine the compressor's starting characteristics with tilting pad bearings, given the new breadboard inverter, and given a thrust bearing that supplies a smaller radial force than the permanent magnet. Repeated smooth start-ups have been achieved, and peak starting currents drawn from the inverter have been modest, well within the ratings of the MOSFET's. These tests are described in the following paragraphs.

The tilt pad bearings and the new thrust bearings used for the start-up tests were fabricated under the concurrent SSRB cryocooler development project. The start-up tests to verify the starting current capability of the inverter were performed under the present inverter project. Further related tests, focusing on the influences of rotational speed and thrust bearing parameters on stability of the tilt pad bearings, were performed under the SSRB project. Results of those tests are described in the test report for that project.

The start-up tests were run with two different compressor assemblies. The first assembly was the same one used for the steady-state tests, except that tilt pad bearings replaced the pressurized bearings and an electromagnet replaced the thrust bearing's permanent magnet. The electromagnet could be operated with reduced current at start-up to provide a much lower radial load on the shaft against the tilt pad bearings than the permanent magnet had provided. The second assembly was essentially a duplicate machine. Its impeller contained a self-acting spiral groove thrust bearing for comparative testing.

No significant difference was observed between the two assemblies in terms of start-up behavior of the motor and inverter. The bulk of the tests, consisting of up to 30 repeated starts, were performed with the first assembly. For each of these 20 to 30 starts, the inverter frequency f was set for 3 kHz, the DC voltage $V_0$ was set for 8 volts, 5 volts DC were applied to the thrust bearing coil, and the throttle was moderately open. Based on visual observation of the digital multimeter, the DC current $i_0$ would appear to reach a peak of approximately 8 to 10 amps, and then fall off rapidly as the shaft accelerated, stabilizing at 5 amps at a rotational speed just under 3000 rev/s. Because of the short duration of this process, it was not possible to get a more accurate visual reading of the peak current. The 8 volt—3 kHz starting condition for these tests does not necessarily represent an optimum starting condition for the machine. It was a conservative choice for initial tests with the tilt pad bearings. It may be feasible and advantageous eventually to use a higher starting frequency.

Given the uncertainty in the measurement of the peak starting current, locked rotor tests were conducted to determine the maximum current that the motor can draw when started with a particular voltage and frequency. In the locked rotor test, the rotor is held stationary to enable current to be measured at the point of minimum motor impedance (zero speed). Since this minimum impedance is predominantly reactive, current should be proportional to the voltage-frequency ration $V_0/f$. Torque on the locked rotor can be shown to be proportional to the square of the motor current and inversely proportional to frequency.

In an actual start-up, the shaft starts spinning instantly if the locked rotor torque corresponding to the starting values of $V_0$ and f exceeds the frictional torque. The locked rotor current only exists momentarily. Its duration would depend on how rapidly the shaft accelerates. If the frictional torque exceeds the locked rotor torque, the locked rotor current would flow indefinitely and the shaft does not spin. To start successfully, the locked rotor torque has to be increased by either increasing $V_0$ or decreasing f. To increase the locked rotor torque without increasing the locked rotor current, is decreased while holding $V_0/f$ constant. In this regard, the cautious approach of starting the compressor at reduced frequency reflects a desire to achieve a conservatively high starting torque for a given current. Starting at 8 kHz might be possible. The locked rotor current can be higher for the same torque.

Figure 31:
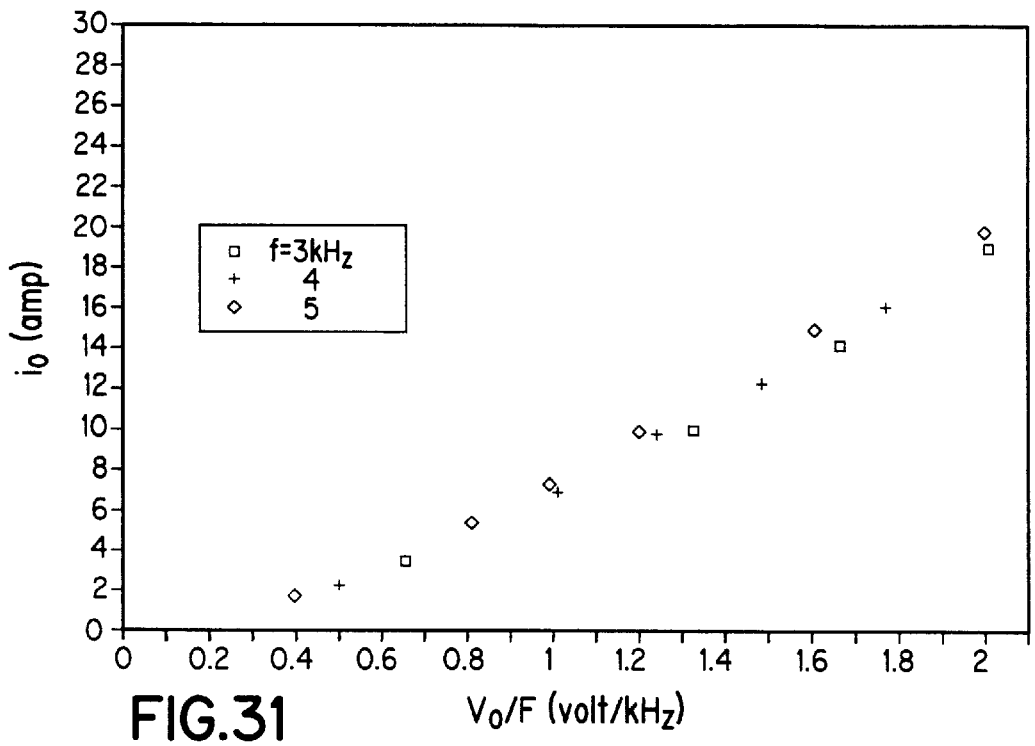
FIG. 31 shows DC current ($i_o$) and DC voltage-frequency ratio ($V_O/f$) for locked rotor test at inverter frequencies (f) of 3, 4 and 5 kHz.
Figure 32:
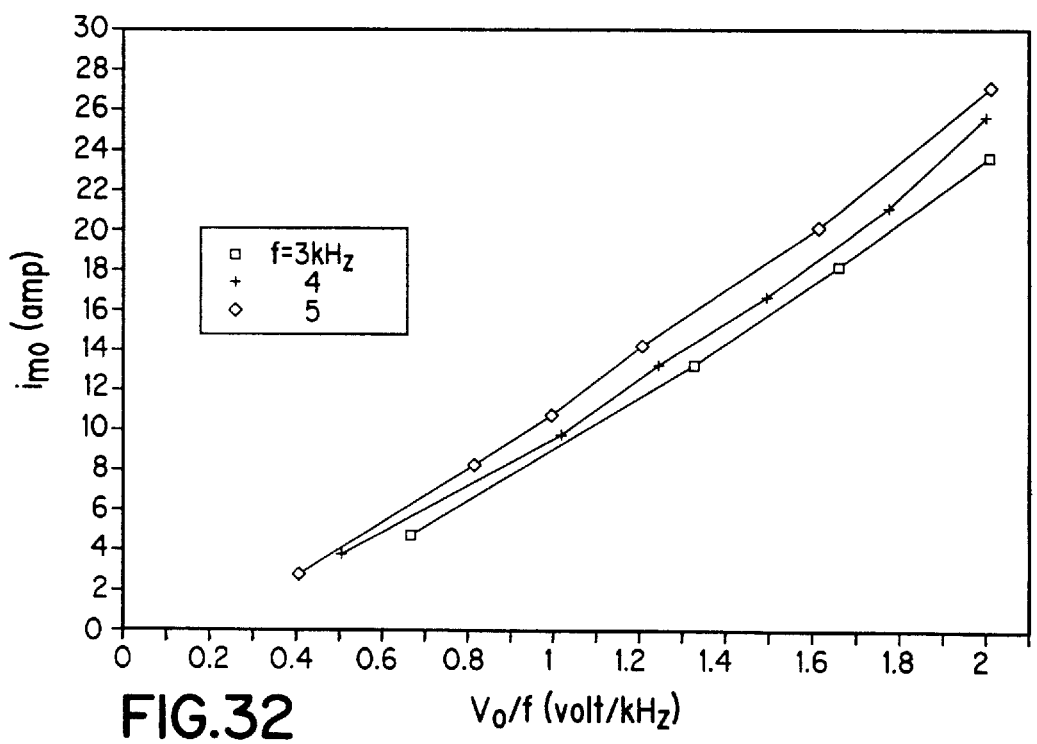
FIG. 32 shows motor current waveform amplitude ($i_{m0}$) and DC voltage-frequency ratio ($V_O/f$) for locked rotor test at inverter frequencies (f) of 3, 4 and 5 kHz.
Figure 33:
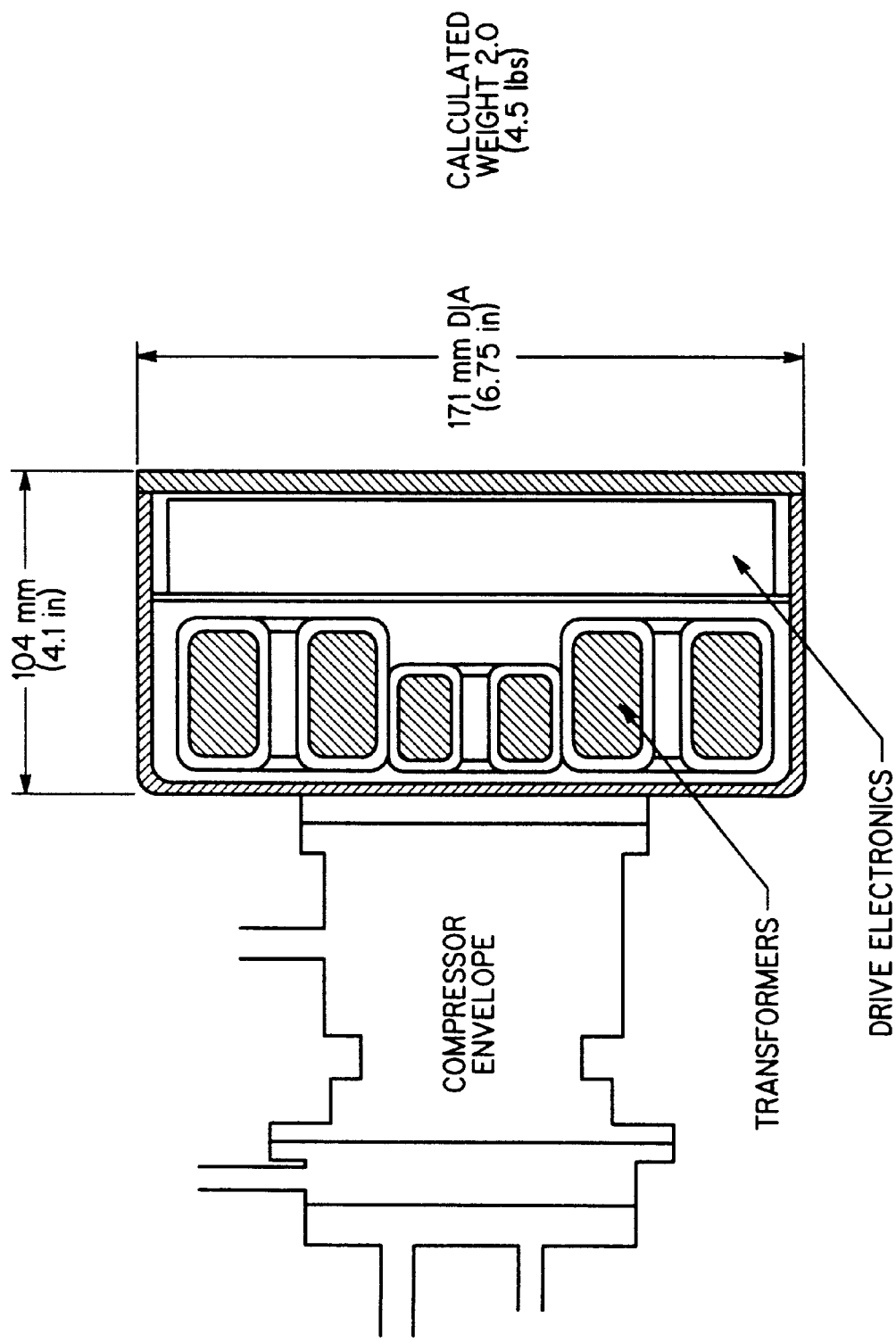
FIG. 33 illustrates an arrangement of a compressor and an inverter.

Locked rotor current was measured at frequencies of 3, 4 and 5 kHz, at $V_0/f$ ratios up to 2 volt/kHz. Measured values of $i_0$ and $i_{m0}$ are plotted as functions of $V_0/f$ in FIGS. 31 and 32. The 8 to 10 amp peak DC currents that were observed during the actual start-up tests can be seen from FIG. 31 to correspond to a $V_0/f$ value of approximately 1 volt/kHz. The $V_0/f$ value for the start-up tests, however, was 2.667 volt/kHz, which would, from an extrapolation of FIG. 31, result in a locked rotor DC current on the order of 25 to 30 amps. That currents this high were not seen during the start-up tests is evidence that the starting torque was more than adequate to instantly overcome friction and accelerate the rotor.

From Equations (16) to (18) with $N_{sa}/N_{pa}=2/3$ and $N_{sb}/N_{pb}=1/2$, the peak primary lead current is given by:

$$i_{p0}=0.601 \times i_{m0}$$

Since $i_p$ flows for 50% of the time through each MOSFET switch, and since each switch consists of two MOSFET's in parallel, the rms current through each MOSFET can be shown to equal $i_{p0}/4=0.150 \times i_{m0}$. Therefore, under the most severe locked rotor test condition ($V_0/f=2$ volt/kHz, f—5 kHz), the measured $i_{m0}$ value of 28 amps corresponds to only 4.2 amps-rms in each MOSFET, safely below the 20 to 28 amp continuous current rating of the IRF540 MOSFET's. From an extrapolation of FIG. 32, the locked rotor condition for the actual start-up tests, had it been realized, would have resulted in approximately $i_{m0}=40$ amps, for which the MOSFET rms currents would have been 6 amps, still a safe value.

From the standpoint of the inverter, the most conservative way to start the motor is to limit the starting $V_0/f$ value to a level for which the MOSFET currents for a locked rotor are conservative. If the motor is able to accelerate quickly enough that the locked rotor current is not realized, as was evidence from the start-up tests, it may be possible to use less conservative $V_0/f$ values (still keeping $V_0/f$ below the level that would saturate the motor or the inverter transformers), enabling a higher starting frequency to be used while maintaining a conservative starting torque level. Ideally, to keep the controls as simple as possible, it would be most desirable to start the motor at its 8 kHz design frequency.

Figure 34B:
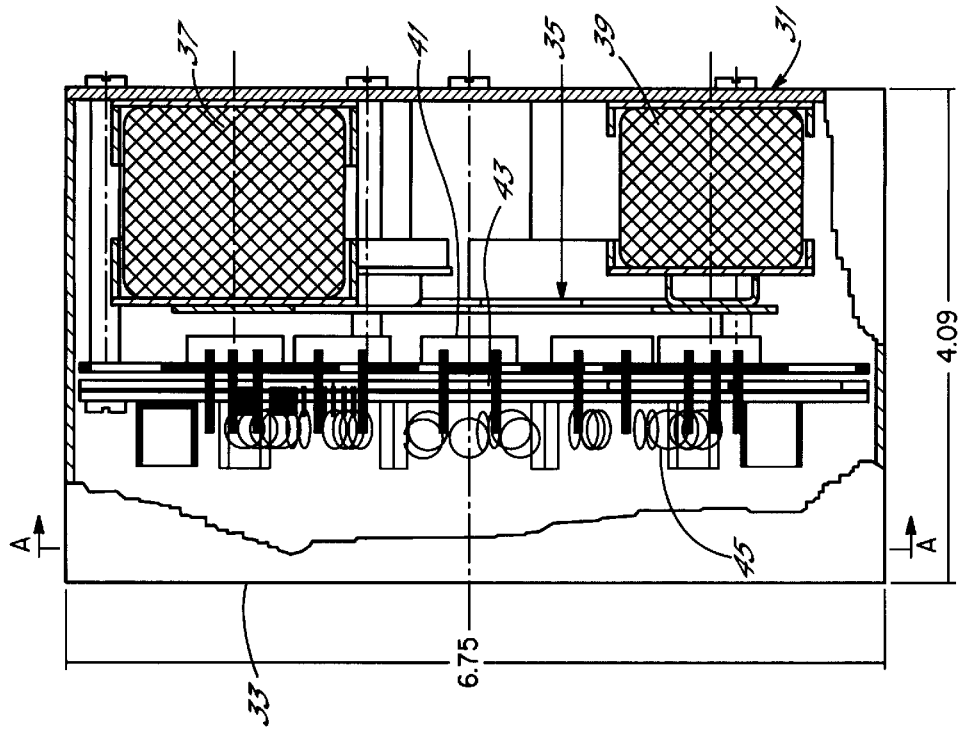
FIGS. 34a and 34b are a plan view and side elevation layout of an inverter.
Figure 34A:
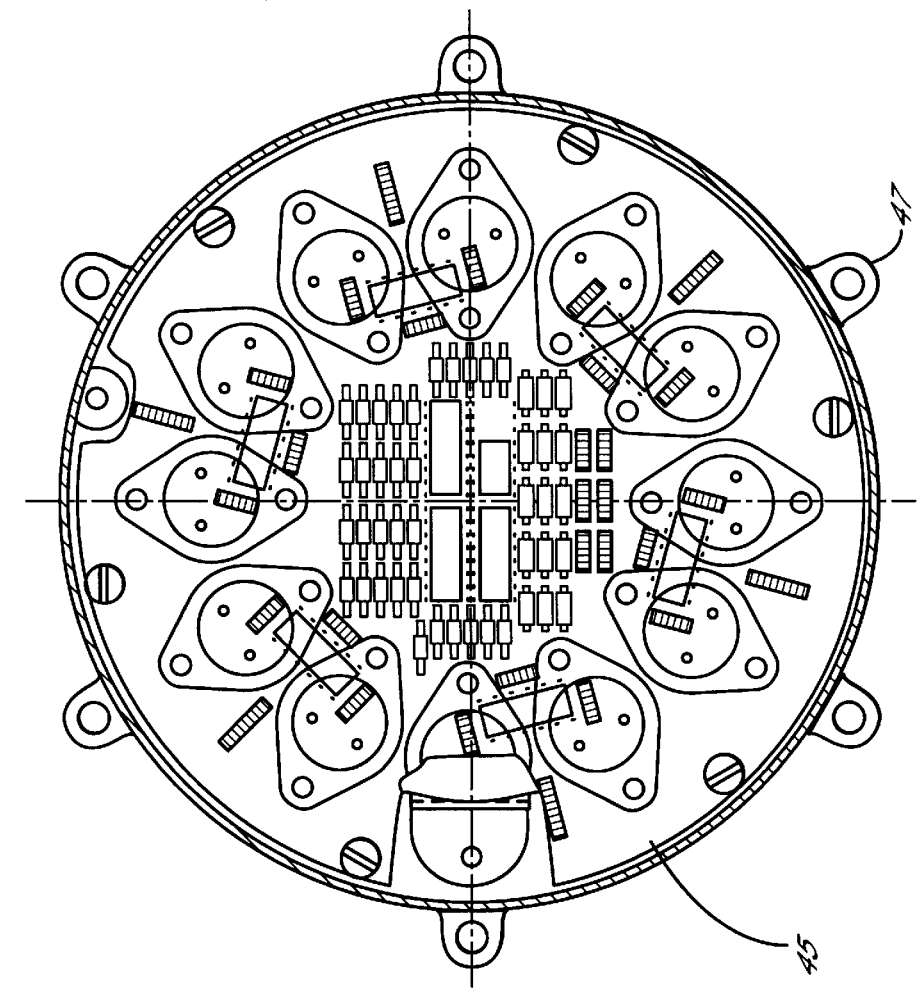

FIG. 34 shows a mechanical layout of the proposed-flight inverter. Table 4 is a preliminary Materials and Parts List that accompanies the layout. The circular circuit board 45 sits above the toroidal transformers 37 and 39. The board 45 has a single layer printed circuit board backed by an aluminum heat sink plate 43 of 0.090 inch thickness. The heat sink plate is on the underside of the board, facing the transformers. The twelve MOSFET's are mounted directly to the heat sink plate, which places them underneath the PC board as shown in FIG. 34. The remaining components are mounted to the top side of the PC board. The IR2110 driver chips are positioned directly above the MOSFET's. The three 4013 D-type flip-flop chips and the 555 timing chip are positioned in the center of the board.

TABLE 4

Materials and Parts List
Materials and Processes for Inverter (D-6836-2009)

| Assembly Find No. | Part or Subassembly | Materials and Treatment | Manufacturing Process | Tests |
| --- | --- | --- | --- | --- |
| 31 | Base Plate | Aluminum Anodize | Machining Fastening | None |
| 33 | Cover | Aluminum Anodize | Machining Fastening Forming | None |
| 35 | Top Plate Assembly | Aluminum Anodize | Machining Fastening Forming | None |
| 37 and 39 | Transformer | Ferrite PTFE Copper Wire | Winding | Continuity |
| 41 | Transistor | | Fastening Soldering | Verification |
| 43 | Heat Sink | Aluminum | Machining | None |
| 45 | Circuit Board | Polyimide-Glass Electronics** Solder-Sn63 Pb37 | Assembly Soldering | Verification |

The inverter housing has an aluminum base plate 31 which attaches to the compressor housing and to which the transformers and PC board are structurally and thermally attached, and a cylindrical aluminum cover plate 35. The PC board is attached to the base plate through six aluminum stand-off rods 47 at the periphery of the board which provide thermal conduction to the base plate. Each transformer is held to the base plate through a pair of aluminum covers that fits over each end of the transformer. A hold-down ring clamps the six upper transformer covers to the base plate. The lower transformer covers conduct heat directly to the base plate. The upper covers conduct heat to the base plate through the hold-down ring. Weight of the complete inverter assembly has been estimated to be 2.0 kg.

Logic circuitry executes the start-up sequence. The circuitry is strictly of low power logic components that could be mounted on a second circular board that would be positioned above the main board through similar stand-off rods. A second board might require a minimal lengthening of the cylindrical envelope. A DC-to-DC converter to regulate the DC voltage supplied to the inverter from the spacecraft bus can be provided. Options include an off-the-shelf converter that would be a separate module of the cryocooler, or a custom designed converter that could be integrated into the inverter package.

Reduction in power levels through improvement of the compressor efficiency and the use of higher performance magnetic materials present a significant opportunity for reduction of the transformer sizes and consequent shrinking and weight reduction of the inverter package.

The overall objective of the high frequency inverter for miniature motors is driving a miniature centrifugal compressor.

The inverter design is based on a unique topology for a transformer coupled inverter. The inverter can be sized for a wide range of applications and operating conditions. As a result of extensive measurement and analysis, waveform details and loss mechanisms are well understood and highly predictable.

The inverter topology uses six transformers and twelve MOSFET switches to generate stepped AC voltage waveforms. Through proper selection of transformer turns ratios, all harmonics below the eleventh can be eliminated. The breadboard inverter developed has a design point efficiency of 96.7% at a frequency of 8 kHz and an output power of 175 watts.

Starting currents drawn by the compressor's induction motor were measured and are well within the current ratings of the MOSFET switches.

The inverter is an open-loop system with minimal control requirement. Key control variables are input DC voltage, which will be fixed by a pre-regulator, and frequency, which will be fixed by a potentiometer setting in a simple timing circuit.

Prospects for high reliability over a 5–10 year mission life in space are excellent based on the following:

Small number of electronic components (12 discrete MOSFET's, 9 integrated circuit elements).

MOSFET current for normal operation are within 20% of rated currents.

All electronic components in engineering model design are available in S-class or with comparable MIL qualifications.

The design can readily be modified, by adjusting the transformer turns ratios, to accommodate different DC bus voltage levels associated with different mission requirements. Operation at higher DC voltage levels will tend to improve the inverter efficiency.

It may be possible to reduce the weight of the inverter transformers by replacing the present ferrite cores with high performance magnetic alloys.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A power inverter for generating an alternating current signal at two or more output terminals relative to a neutral terminal, from a direct current signal at a power terminal relative to a ground terminal, comprising at least four transformers each having a primary winding and a secondary winding, the primary windings of the four transformers being connected in series in a transformer ring, pairs of the secondary windings being connected in series between the neutral terminal and a respective one of the output terminals, the turns ratio between the primary and secondary winding on a first transformer being different from the turns ratio between the primary and secondary winding on a second transformer, at least four switching circuits each connected to a node between a respective pair of the primary windings in the transformer ring, the switching circuits alternately connecting the nodes to which they are connected to the power terminal and the ground terminal in response to control signals.

2. The power inverter of claim 1 wherein the transformers comprise transformers with larger cores and transformers with smaller cores.

3. The power inverter of claim 2 wherein the primary windings of the transformers with smaller cores alternate with the primary windings of the transformers with larger cores in the transformer ring.

4. The power inverter of claim 2 wherein the pairs of secondary windings connected in series between the neutral terminal and an output terminal comprise a secondary winding of a transformer with a smaller core and a secondary winding of a transformer with a larger core.

5. The power inverter of claim 2 wherein the control signals apply the direct current signal across the primary winding of a smaller transformer for a shorter period of time than across the primary winding of a larger transformer.

6. The power inverter of claim 1 wherein the switching circuit connected to a node comprises a pair of switches, one switch connected between the node and power terminal and one switch connected between the node and ground terminal.

7. The power inverter of claim 6 wherein the switches are driven by signals derived from complementary outputs of a flip-flop circuit.

8. The power inverter of claim 7 wherein the control signals are generated by flip-flop circuits connected in a flip-flop ring such that an output of each flip-flop circuit is connected to the input of the next flip-flop circuit in the flip-flop ring.

9. The power inverter of claim 8 wherein the outputs of adjacent flip-flop circuits in the flip-flop ring are connected to switching circuits at opposite positions in the transformer ring.

10. The power inverter of claim 1 wherein the transformer ring comprises six transformers, the six primary windings of the six transformers being connected in series to form the transformer ring.

11. The power inverter of claim 10 wherein the inverter has three output terminals for producing a three phase alternating current signal, the six secondary windings of the six transformers being arranged into three pairs, each pair of the secondary windings being connected in series between the neutral terminal and a respective one of the output terminals.

12. The power inverter of claim 11 wherein each pair of secondary windings comprises two secondaries from transformers in opposite positions in the transformer ring.

13. A method for generating an alternating current signal at two or more output terminals relative to a neutral terminal, from a direct current signal at a power terminal relative to a ground terminal, comprising provinding at least four transformers each having a primary winding and a secondary winding, the turns ratio between the primary and secondary winding on a first transformer being different from the turns ratio between the primary and secondary winding on a second transformer, connecting the primary windings of the four transformers in series in a transformer ring, connecting pairs of the secondary windings in series between the neutral terminal and a respective one of the output terminals, connecting a switching circuit to each node between a respective pair of the primary windings in the transformer ring, controlling the switching circuits to alternately connect the nodes to which they are connected to the power terminal and the ground terminal.

14. The method of claim 13 wherein the transformers comprise transformers with larger cores and transformers with smaller cores.

15. The method of claim 14 wherein the primary windings of the transformers with smaller cores are connected alternating with the primary windings of the transformers with larger cores in the transformer ring.

16. The method of claim 14 wherein the pairs of secondary windings connected in series between the neutral terminal and an output terminal comprise a secondary winding of a transformer with a smaller core and a secondary winding of a transformer with a larger core.

17. The method of claim 14 wherein the switching circuits are controlled to apply the direct current signal across the primary winding of a smaller transformer for a shorter period of time than across the primary winding of a larger transformer.

18. The method of claim 13 wherein the switching circuit connected to a node comprises a pair of switches, one switch connected between the node and power terminal and one switch connected between the node and ground terminal.

19. The method of claim 18 wherein the switches of the switching circuit are controlled with signals derived from complementary outputs of a flip-flop circuit.

20. The method of claim 19 wherein the switches of all switching circuits are controlled with signals derived from flip-flop circuits, further comprising connecting the flip-flop circuits in a flip-flop ring such that an output of each flip-flop circuit is connected to the input of the next flip-flop circuit in the flip-flop ring.

21. The method of claim 20 wherein switching circuits at opposite positions in the transformer ring are controlled by adjacent flip-flop circuits in the flip-flop ring.

22. The method of claim 13 wherein the transformer ring comprises six transformers, the six primary windings of the six transformers being connected in series to form the transformer ring.

23. The method of claim 22 adapted for generating a three phase alternating current signal at three output terminals, the six secondary windings of the six transformers being arranged into three pairs, each pair of the secondary windings being connected in series between the neutral terminal and a respective one of the output terminals.

24. The method of claim 23 wherein each pair of secondary windings comprises two secondaries from transformers in opposite positions in the transformer ring.

25. A power inverter for generating an alternating current signal at two or more output terminals relative to a neutral terminal, from a direct current signal at a power terminal relative to a ground terminal, comprising at least four transformers including transformers with larger cores and transformers with smaller cores, each transformer having a primary winding and a secondary winding, the primary windings of the four transformers being connected in series in a transformer ring, pairs of the secondary windings being connected in series between the neutral terminal and a respective one of the output terminals, at least four switching circuits each connected to a node between a respective pair of the primary windings in the transformer ring, the switching circuits alternately connecting the nodes to which they are connected to the power terminal and the ground terminal in response to control signals.

26. The power inverter of claim 25 wherein the primary windings of the transformers with smaller cores alternating with the primary windings of the transformers with larger cores in the transformer ring.

27. The power inverter of claim 25 wherein the pairs of secondary windings connected in series between the neutral terminal and an output terminal comprise a secondary winding of a transformer with a smaller core and a secondary winding of a transformer with a larger core.

28. The power inverter of claim 25 wherein the control signals apply the direct current signal across the primary winding of a smaller transformer for a shorter period of time than across the primary winding of a larger transformer.

29. The power inverter of claim 25 wherein the switching circuit connected to a node comprises a pair of switches, one switch connected between the node and power terminal and one switch connected between the node and ground terminal.

30. The power inverter of claim 29 wherein the switches are driven by signals derived from complementary outputs of a flip-flop circuit.

31. The power inverter of claim 30 wherein the control signals are generated by flip-flop circuits connected in a flip-flop ring such that an output of each flip-flop circuit is connected to the input of the next flip-flop circuit in the flip-flop ring.

32. The power inverter of claim 31 wherein the outputs of adjacent flip-flop circuits in the flip-flop ring are connected to switching circuits at opposite positions in the transformer ring.

33. The power inverter of claim 25 wherein the transformer ring comprises six transformers, the six primary windings of the six transformers being connected in series to form the transformer ring.

34. The power inverter of claim 33 wherein the inverter has three output terminals for producing a three phase alternating current signal, the six secondary windings of the six transformers being arranged into three pairs, each pair of the secondary windings being connected in series between the neutral terminal and a respective one of the output terminals.

35. The power inverter of claim 34 wherein each pair of secondary windings comprises two secondaries from transformers in opposite positions in the transformer ring.

36. A method for generating an alternating current signal at two or more output terminals relative to a neutral terminal, from a direct current signal at a power terminal relative to a ground terminal, comprising providing at least four transformers including transformers with larger cores and transformers with smaller cores, each having a primary winding and a secondary winding, connecting the primary windings of the four transformers in series in a transformer ring, connecting pairs of the secondary windings in series between the neutral terminal and a respective one of the output terminals, connecting a switching circuit to each node between a respective pair of the primary windings in the transformer ring, controlling the switching circuits to alternately connect the nodes to which they are connected to the power terminal and the ground terminal.

37. The method of claim 36 wherein the primary windings of the transformers with smaller cores are connected alternating with the primary windings of the transformers with larger cores in the transformer ring.

38. The method of claim 36 wherein the pairs of secondary windings connected in series between the neutral terminal and an output terminal comprise a secondary winding of a transformer with a smaller core and a secondary winding of a transformer with a larger core.

39. The method of claim 36 wherein the switching circuits are controlled to apply the direct current signal across the primary winding of a smaller transformer for a shorter period of time than across the primary winding of a larger transformer.

40. The method of claim 36 wherein the switching circuit connected to a node comprises a pair of switches, one switch connected between the node and power terminal and one switch connected between the node and ground terminal.

41. The method of claim 40 wherein the switches of the switching circuit are controlled with signals derived from complementary outputs of a flip-flop circuit.

42. The method of claim 41 wherein the switches of all switching circuits are controlled with signals derived from flip-flop circuits, further comprising connecting the flip-flop circuits in a flip-flop ring such that an output of each flip-flop circuit is connected to the input of the next flip-flop circuit in the flip-flop ring.

43. The method of claim 42 wherein switching circuits at opposite positions in the transformer ring are controlled by adjacent flip-flop circuits in the flip-flop ring.

44. The method of claim 36 wherein the transformer ring comprises six transformers, the six primary windings of the six transformers being connected in series to form the transformer ring.

45. The method of claim 44 adapted for generating a three phase alternating current signal at three output terminals, the six secondary windings of the six transformers being arranged into three pairs, each pair of the secondary windings being connected in series between the neutral terminal and a respective one of the output terminals.

46. The method of claim 45 wherein each pair of secondary windings comprises two secondaries from transformers in opposite positions in the transformer ring.

* * * * *